(12) United States Patent
Terase et al.

(10) Patent No.: US 6,534,176 B2
(45) Date of Patent: Mar. 18, 2003

(54) SCALY SILICA PARTICLES AND HARDENABLE COMPOSITION CONTAINING THEM

(75) Inventors: Kunihiko Terase, Fukuoka (JP); Masaki Inoue, Fukuoka (JP); Atsunari Fujii, Fukuoka (JP); Takayoshi Sasaki, Fukuoka (JP); Shikou Minohara, Fukuoka (JP); Yoshimi Ohba, Fukuoka (JP)

(73) Assignees: Asahi Glass Company, Limited, Tokyo (JP); Dohkai Chemical Industry Co., Ltd., Kitakyushu (JP)

( * ) Notice: Subject to any disclaimer, the term of this patent is extended or adjusted under 35 U.S.C. 154(b) by 71 days.

(21) Appl. No.: 09/729,822

(22) Filed: Dec. 6, 2000

(65) Prior Publication Data

US 2001/0003358 A1 Jun. 14, 2001

(30) Foreign Application Priority Data

| Dec. 10, 1999 | (JP) | ............................................. 11-351182 |
| May 12, 2000 | (JP) | ........................................ 2000-139659 |
| Jul. 7, 2000 | (JP) | ........................................ 2000-206264 |

(51) Int. Cl.$^7$ .............................. C09C 1/04; B32B 5/16
(52) U.S. Cl. ........................ 428/403; 428/404; 428/407; 406/425; 406/436; 406/444; 406/446; 406/454; 406/482; 106/492; 502/239; 502/243
(58) Field of Search ................................ 428/403, 404, 428/407; 106/425, 436, 444, 446, 454, 482, 492; 502/239, 243

(56) References Cited

U.S. PATENT DOCUMENTS

6,077,341 A * 6/2000 Terase ........................ 106/482

FOREIGN PATENT DOCUMENTS

| EP | 0 904 768 | 3/1999 |
| EP | 0904768 | * 3/1999 |
| EP | 0 372 983 | 6/2000 |

OTHER PUBLICATIONS

Chemical Abstracts, No. 18, p. 173, AN 113:155341n, SU 1,576,484, Jul. 7, 1990.
Patent Abstracts of Japan, vol. 1999, No. 04, Apr. 30, 1999, JP 11–011927, Jan. 19, 1999.
Database WPI, AN 1999–175461, JP 11–029317, Feb. 2, 1999.
Database WPI, AN 1992–214231, JP 04–145011, May 19, 1992.
Database WPI, AN 1997–276850, JP 09–100460, Apr. 15, 1997.

* cited by examiner

Primary Examiner—Leszek Kiliman
(74) Attorney, Agent, or Firm—Oblon, Spivak, McClelland, Maier & Neustadt, P.C.

(57) ABSTRACT

Scaly silica particles having a laminated structure, consisting essentially of secondary particles of foliar silica, each formed by a plurality of flaky primary particles of scaly silica which are overlaid one on another and aligned face-to-face in parallel with one another, said secondary particles being present independent of one another.

18 Claims, 3 Drawing Sheets

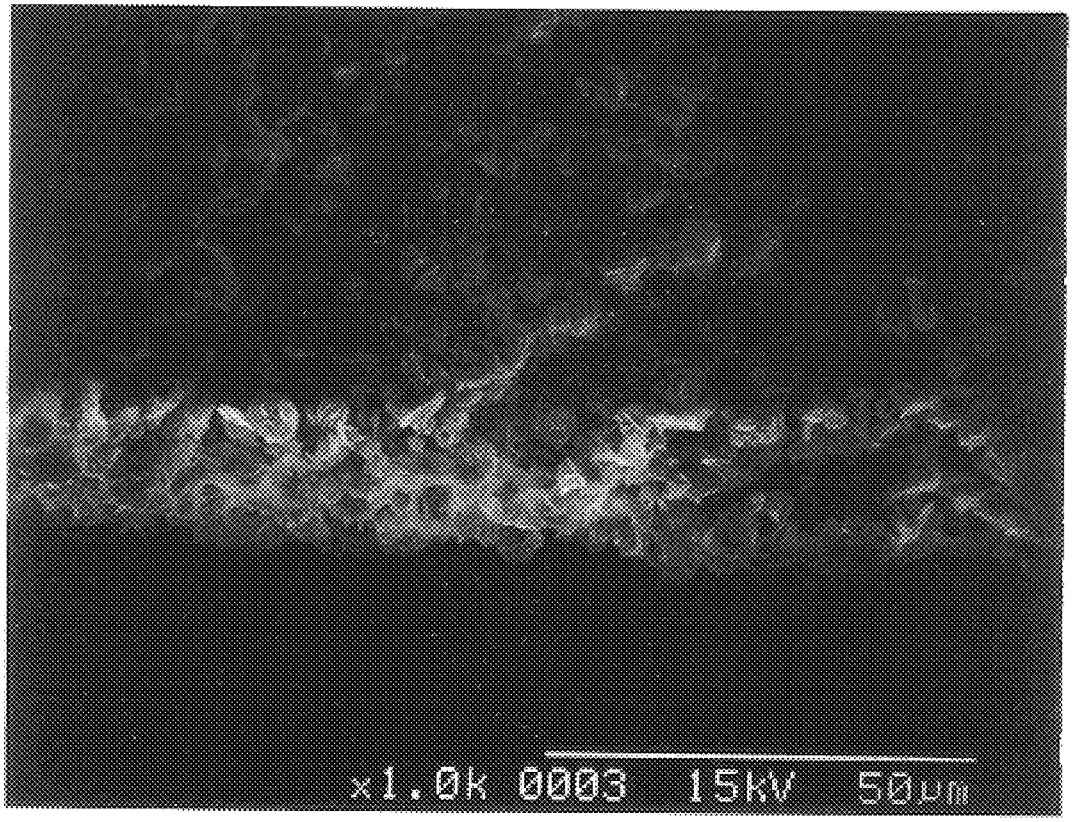
FIG·5

SCALY SILICA PARTICLES AND HARDENABLE COMPOSITION CONTAINING THEM

The present invention relates to scaly silica particles having a self film-forming property and being capable of forming a strong silica coating film even at normal temperature. More particularly, it relates to scaly silica particles capable of forming a strong silica coating film having acid resistance, alkali resistance and heat resistance at the same time, or a hardenable composition or an adhesive composition containing them, and a process for their production.

This hardenable composition is useful for various applications, such as a particle binder, a coating material or agent for exterior or interior of buildings or structures, a coating material or agent having a thermal function (such as heat resistance, heat insulation, fire proofing, or flame retardancy), a coating material or agent having an optical function (such as ultraviolet ray-shielding, selective adsorption of light, or light emission/fluorescence), a coating material or agent having an electrical/magnetical function (such as electrical insulation, electrical conductivity, antistatic function, wave-absorbing or electromagnetic wave-shielding), a coating material or agent having an adsorbing function (such as adsorption and desorption of moisture, adsorption and desorption of gas, or thin layer chromatography), a particle binder for adsorbent particles, a coating material or agent having a catalytic function (such as a photo-oxidation catalyst), a particle binder for catalyst particles, a coating material or agent for a biological function (such as antibacterial, antiseptic, ship bottom anti-fouling, aquaculture or cell culture) and a coating material or agent having a fragrance or deodorant function.

Further, the present invention relates to an adhesive composition capable of forming a strongly bonded product even at a normal temperature. More particularly, it relates to an adhesive composition capable of forming strongly bonded hardened layers having acid resistance, alkali resistance and heat resistance at the same time.

In the present invention, the substrate to which the hardenable composition, specifically, the adhesive composition or the coating material or agent, is applied, may, for example, be a metal, glass, ceramics, a cement hardened product, a plastic, wood or paper, and the form of the substrate may be any one of a flat plate form, a curved surface form, a porous form, a fibrous form, a woven fabric form, a non-woven fabric form or a net structure form and is not particularly limited to any specific form.

Heretofore, for organic coating materials, various materials have been used including highly durable coating materials such as fluorine resin coating materials or acrylic silicon resin coating materials. However, on the other hand, with such organic coating materials, it is necessary to take into consideration various problems specific to them, such as air pollution due to a volatile organic compound (VOC) in a room, provision of an anti-fouling property, provision of moisture permeability or respiratory property, and elimination of an organic solvent.

Further, when photo-oxidation catalyst particles are employed for antibacterial or anti-fouling purposes, an organic coating material or binder is used to fix the particles on a substrate, but such is usually poor in the durability and has many problems such as fire proofing or flame retarding problems. Accordingly, a study has been directed to develop an inorganic coating material or agent which does not essentially have such problems.

As an inorganic coating material or agent, or a particle binder, a silicon type material has been used in many cases from the viewpoint of the safety to human bodies and environment. Among silicon type materials, as a material having a coating film-forming function or a particle-binding function, ① an alkali metal silicate (water glass type) aqueous solution, ② colloidal silica, ③ an organo alkoxy silane and ④ bentonite or smectite, have, for example, been known.

However, ① the alkali metal silicate aqueous solution is highly alkaline and has a problem in the safety in operation, and further, it requires hot air treatment or heating treatment for hardening, whereby hardening at normal temperature is difficult. ② colloidal silica is suitable for a particle binder or a coating agent and is widely employed, but the thickness of the coating which can be formed by colloidal silica alone is usually limited to less than 10 $\mu$m, normally less than 5 $\mu$m, and if the thickness of the coating is thicker, the coating tends to have cracks, whereby no strong coating film can be obtained. Besides, usually, heat treatment is required to improve the strength of the coating film. Further, colloidal silica is amorphous silica, and as such, it has acid resistance, but has a drawback that it is poor in alkali resistance.

On the other hand, ③ the organo alkoxy silane has a drawback such that it requires heat treatment for hardening, or it is poor in alkali resistance. Further, it is essentially an organic material, and the obtainable hardened body does not have flame retardancy. Further, ④ each of bentonite and smectite is poor in the water resistance, acid resistance and alkali resistance.

Further, among silicon type materials, silicas are also known. However, silicas other than colloidal silica, such as silica gel, hydrous silicic acid (so-called white carbon), quartz, cristobalite and tridymite, have problems that they are very poor in the film-forming function (self film-forming property) without a particle binder.

In any case, as mentioned above, among conventional silica type coating film-forming materials, there has been none which has all of a normal temperature hardenable property, a thick-coating property and a self film-forming property (coating properties and binding properties) and which is capable of forming a silica coating film having all of acid resistance, alkali resistance and heat resistance.

On the other hand, as an adhesive composition, various organic adhesives and inorganic adhesives have, heretofore been used. The organic adhesives have a merit that they can be hardened at normal temperature but have a drawback that they are poor in the organic solvent resistance or heat resistance.

Whereas, with the inorganic adhesives, the organic solvent resistance is usually high, and the heat resistance is also usually high, but for their hardening, each of them requires heat treatment at a temperature of from 100 to 150° C., such being inconvenient.

Accordingly, a study has been directed to develop an adhesive which can be hardened at room temperature and which has heat resistance, acid resistance, alkali resistance and organic solvent resistance at the same time.

Heretofore, as an adhesive composition containing a silica component and having an adhesive function, colloidal silica or an aqueous alkali metal silicate solution has been known. However, the colloidal silica has a problem such that the alkali resistance is poor, and heat treatment at a temperature of from 400 to 600° C. is required for its hardening. Further, an aqueous adhesive containing such colloidal silica can hardly form a thick adhesive layer and can hardly provide a stabilized adhesive force.

On the other hand, the alkali metal silicate has a problem that heat treatment at a temperature of from 100 to 600° C.

is required for its hardening, and a thick adhesive layer can likewise hardly be formed.

Further, with an aqueous solution of a water-soluble polymer such as polyvinyl alcohol, polyvinyl pyrrolidone, methyl cellulose, carboxy methyl cellulose or gelatin, it is possible to form an adhesive layer, but when such an aqueous solution is used alone, there will be a problem in the durability of the adhesive layer.

Further, other silicas, i.e. silicas other than colloidal silica, such as silica gel, hydrous silicic acid (so-called white carbon), quartz, cristobalite and tridymite, do not have adhesive functions.

In any case, as mentioned above, among the conventional adhesive compositions, there has been none which has all of a normal temperature hardenable property, organic solvent resistance, acid resistance, alkali resistance and heat resistance.

It is an object of the present invention to provide fine scaly silica having such drawbacks of the conventional silicon type materials basically overcome, which may be used alone, a hardenable composition or an adhesive composition containing it, a hardened product thereof, and a process for producing it.

The present inventors have conducted an extensive study in consideration of the importance of the above object in the field of coating materials or agents, and as a result, have found that in the synthesis of fine scaly low crystalline silica, by controlling the microstructure of the particle form, it is possible to obtain fine scaly silica having a laminated structure, consisting essentially of secondary particles of foliar silica formed by a plurality of flaky primary particles which are overlaid one on another and aligned face-to-face in parallel with one another, said secondary particles being present independent of one another, which has a high self film-forming property, and a composition containing such fine scaly silica can form a coating material, a coating agent or an adhesive having excellent functions. The present invention has been accomplished on the basis of these discoveries.

Namely, the present invention provides the following:

Scaly Silica (1) Scaly silica particles having a laminated structure, consisting essentially of secondary particles of foliar silica, each formed by a plurality of flaky primary particles of scaly silica which are overlaid one on another and aligned face-to-face in parallel with one another, said secondary particles being present independent of one another.

Hardenable Composition or Adhesive Composition (2) A hardenable composition or an adhesive composition comprising the scaly silica particles having the laminated structure as defined in (1) and a volatile liquid.

Here, the volatile liquid means water and/or a volatile liquid other than water (such as a volatile organic solvent).

Hardenable Composition for Forming Heat Insulating Coating (3) A hardenable composition for forming a heat insulating coating, comprising the scaly silica particles having the laminated structure as defined in (1), a volatile liquid and a material having a heat-insulating function.

Hardened Product or Hardened Coating Film (4) A hardened product or hardened coating film, comprising secondary particles of foliar silica formed by a plurality of flaky primary particles of scaly silica overlaid one on another and aligned face-to-face in parallel with one another, wherein the secondary particles are laminated in parallel with one another.

Process for Producing Scaly Silica Particles (5) A process for producing scaly silica particles suitable for a hardenable composition, which consist essentially of secondary particles of foliar silica and have a laminated structure wherein the secondary particles are present independent of one another, said process comprising:

(i) a step of subjecting either silica hydrogel, silica sol or hydrous silicic acid to hydrothermal treatment in the presence of an alkali metal salt to form tertiary agglomerated particles of scaly silica comprising secondary particles of foliar silica, each formed by a plurality of flaky primary particles of scaly silica which are overlaid one on another and aligned face-to-face in parallel with one another, and tertiary particles formed by the secondary particles which are overlaid one on another three dimensionally irregularly to have pore spaces, and (ii) a step of disintegrating and dispersing the tertiary agglomerated particles of scaly silica to form foliar silica particles consisting substantially of secondary particles containing substantially no tertiary particles.

In the accompanying drawings:

FIG. 5 is a scanning electron microscopic photograph of the cross section of the coating film made of tertiary agglomerated particles of silica.

Figure 1:
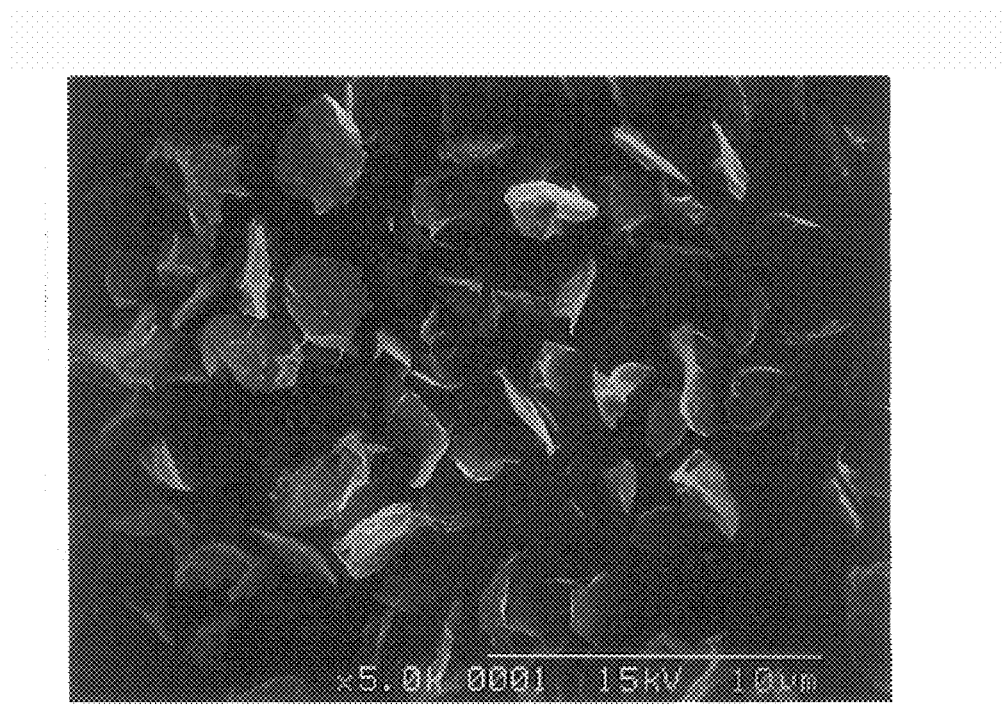
FIG. 1 is a scanning electron microscopic photograph showing the secondary particles of foliar silica of the present invention.

Now, the present invention will be described in detail with reference to the preferred embodiments.

I. Scaly Silica Particles Having a Layered Structure, Comprising Secondary Particles of Foliar Silica Firstly, the scaly silica particles comprising secondary particles of foliar silica of the present invention and a process for their production, will be described.

The scaly silica particles of the present invention are scaly silica (hereinafter sometimes referred to also as the secondary particles of foliar silica of the present invention) having a laminated structure consisting essentially of secondary particles of foliar silica formed by a plurality of flaky primary particles which are overlaid one on another and aligned face-to-face in parallel with one another. In the present invention, silica means generally all of anhydrous silicon oxide, hydrous silicon oxide, polysilicic acid and polysilicates.

The flaky primary particles are those having a thickness of from 0.001 to 0.1 $\mu$m. Such flaky primary particles are aligned face-to-face in parallel with one another to form one or a plurality of secondary particles of foliar silica. Such secondary particles are scaly silica such that the thickness of the secondary particles is from 0.001 to 3 $\mu$m, preferably from 0.005 to 2 $\mu$m, the ratio (the aspect ratio) of the maximum length of the foliar secondary particle (plate) to the thickness is at least 10, preferably at least 30, more preferably at least 50, and the ratio of the minimum length of the foliar secondary particle (plate) to the thickness, is at least 2, preferably at least 5, more preferably at least 10. Such secondary particles are present independent of one another without being agglomerated.

If the thickness of the foliar secondary particles is less than 0.001 µm, the mechanical strength of the foliar secondary particles tends to be inadequate, such being undesirable. On the other hand, if the thickness of the foliar secondary particles is more than 3 µm, it tends to be difficult to obtain sufficient characteristics as a hardened product, when the secondary particles are used for the hardened product.

The upper limit of the ratio of the maximum length to the thickness of the foliar secondary particle is not particularly limited, but is practically at most 300, preferably at most 200. Likewise, the upper limit of the ratio of the minimum length to the thickness of foliar secondary particle is not particularly limited, but is practically at most 150, preferably at most 100.

In the present invention, the thickness and the length of the foliar secondary particles mean the respective average values with respect to the secondary particles, unless otherwise specified.

In the present invention, scaly means that the particles have substantially a thin plate-like form, and such a form may further be partially or entirely curved or twisted. Agglomerated particles (tertiary particles) of silica formed by such foliar secondary particles, which are three dimensionally irregularly overlaid one on another to have pore spaces, have perse already been known heretofore as an object for academic researches, as so-called silica-X (hereinafter represented also by $SiO_2$—X) pg,14 or silica-Y, (likewise hereinafter represented also by $SiO_2$—Y).

The secondary particles of foliar silica of the present invention are those obtained by disintegrating such agglomerated particles (tertiary particles) of silica (such as $SiO_2$—X or $SiO_2$—Y) to foliar secondary particles by a specific means which will be described hereinafter.

Silica-X or the like which is such tertiary agglomerated particles of silica, is an intermediate or metastable phase or a weak crystal phase which may be called quasi-crystalline of silica, which forms during the process for forming cristobalite or quartz by hydrothermal treatment of amorphous silica.

Silica-X and silica-Y are different in their X-ray diffraction patterns, but the particle appearances as observed by an electron microscope are extremely similar and each of them is preferably useful for the purpose of obtaining secondary particles of foliar silica of the present invention.

Silica-X and silica-Y are perse known. However, a conventional typical method for producing silica-X or the like has been such that silica gel (silica xerogel), aerosil, precipitated silica or the like is used as a starting material, and such a starting material is subjected to hydrothermal treatment, and as such, it has had a problem that the reaction time is extremely long. For example, Heydemann who discovered silica-X first, used precipitated silica and aerosil (ultrafine particles of amorphous silica obtainable by high temperature heat decomposition of $SiCl_4$) as starting materials, but took an extremely long time of from 1.5 to 24 days at 180° C. to convert them to silica-X in an autoclave (Heydemann, A., Beitr. Mineral. Petrogr., 10, 242–259 (1964)).

On the other hand, with respect to silica-Y and crystals similar to silica-X, Mitsyuk et al. employed silica gel having a specific surface area of from 600 to 700 m²/g as a starting material to obtain silica-Y, etc. by subjecting the starting material to hydrothermal treatment in a solution of e.g. NaOH at a temperature of from 145 to 155° C. for a long time (from 200 to 220 hours) (Mitsyuk, B. A. et al. Geochem. Int. 13, 101–111 (1976)), and Kitahara et al. employed silica gel having a specific surface area of 600 m²/g (silica gel (G), manufactured by Wako Junyaku K.K.) as the starting material, to obtain silica-X and silica-Y by subjecting the starting material to hydrothermal treatment in a KOH solution containing NaCl at a temperature of from 150 to 160° C. also for a long time (from 70 to 170 hours) (Kitahara S, et al. Proc. Inst. Symp. Hydrotherm. React. 1ST (1983)).

Thus, the methods of using silica gel as a starting material and converting it to silica-X, etc. by hydrothermal treatment, have had a problem in their industrial applications that they require an extremely long reaction time (time for hydrothermal treatment). Of course, the time may be shortened by increasing the temperature of the hydrothermal treatment, but in such a case, the stability within the operation range tends to be lost, and there will be a serious problem that quartz or cristobalite tends to form.

Accordingly, a technique is desired to produce silica-X, etc. which are agglomerated particles (tertiary particles) of silica required to obtain secondary particles of foliar silica of the present invention, at a lower temperature in a sufficiently short period of time for industrial operation, without forming quartz, etc.

As mentioned above, silica-X and silica-Y were first reported by Heydemann and Mitsyuk and named as such by them. Subsequently, however, it has been made clear that such silicas correspond to one type so-called a layered polysilicic acid or its salt. Here, the layered polysilicic acid is a polysilicic acid having a silicate layer structure wherein the basic units are composed solely of $SiO_4$ tetrahedron.

The layered polysilicic acid or its salt may, for example, be silica-X, silica-Y, kenyaite, magadiite, makatite, ilerite, kanemite or octosilicate, and it is a general name for a H-type having alkali metals in a silicate ion-exchanged with hydrogen ions, for example, by acid treatment of a layered polysilicate and a salt type such as an alkali metal salt before such acid treatment. In the present invention, the layered polysilicic acid means both of the above H-type and the salt type such as the alkali metal salt.

In the present invention, as the layered polysilicic acid, both the H-type layered polysilicic acid and the layered polysilicate of an alkali metal salt type may be employed. However, when the two are compared, the layered polysilicate of an alkali metal salt type has a pH which is highly alkaline, while the H-type layered polysilicic acid has a pH which is nearly neutral. Accordingly, in the present invention, the H-type layered polysilicic acid is more suitable.

On the other hand, as layered polysilicic acids and their salts other than silica-X and silica-Y, natural or synthetic layered polysilicic acids or their salts are known, such as kanemite, makatite, magadiite, kenyaite, ilerite and octosilicate, as mentioned above, and there have been many research reports relating to them. For example, in Japan, as a typical and progressive theory, Katsunori Kosuge, Clay Science, 33(4), 215–222 (1994) is available, and with respect to kenyaite, K. Beneke et al., American Mineralogist, 68, 818–826, (1983), etc. are available. Further, the nomenclature relating to the layered polysilicic acid or the layered polysilicate, is described in the general discussion by Kuroda (Surface, vol. 27, No. 2, 77–88 (1989)).

In the layered polysilicate, alkali metals (such as sodium, potassium and lithium) are present as elements constituting the crystals. Accordingly, the layered polysilicate is highly alkaline. However, when it is washed with water or an acid, the alkali metals in the crystals are ion-exchanged with $H^+$ ions, whereby it will be converted to the H-type layered polysilicic acid. On the other hand, when this H-type layered polysilicic acid is treated with an alkali metal-containing aqueous solution, the $H^+$ ions will be ion-exchanged with the alkali metal ions, whereby it will be converted to a layered polysilicate. It is well known that such an ion exchange reaction takes place reversibly at an optional ion exchange ratio. However, the boundary between the layered polysilicic acid and the layered polysilicate is not clearly defined in terms of the degree of the ion exchange ratio.

Usually, the degree of acidity of the layered polysilicate or the H-type layered polysilicic acid is measured by a titration method (using an aqueous solution of sulfuric acid, hydrochloric acid, sodium hydroxide or sodium chloride as a titration liquid) as disclosed, for example, in JP-A-60-161319, and the degree of acidity is represented by mmol of titratable $H^+$ ions per mol of $SiO_2$.

The titratable acidity of the above-mentioned various layered polysilicates obtainable by this measuring method, is from about 80 to 500 mmol of $H^+$/mol of $SiO_2$.

For the secondary particles of foliar silica of the present invention, such titratable acidity is preferably from 0.01 to 70 mmol of $H^+$/mol of $SiO_2$, more preferably from 0.01 to 50 mmol of $H^+$/mol of $SiO_2$, most preferably from 0.01 to 20 mmol of $H^+$/mol of $SiO_2$.

On the other hand, in a case where a Na-type layered polysilicate is converted to H-type by hydrogen ion exchange, there may be a method wherein sodium remaining in the layered polysilicate is measured as mass ppm of sodium per unit mass of $SiO_2$ and represented by such mass ppm.

According to this method, for the secondary particles of foliar silica of the present invention, the sodium per mass of $SiO_2$ is preferably from 1 to 27,000 ppm, more preferably from 1 to 20,000 ppm, most preferably from 1 to 8,000 ppm.

Formation of Agglomerated Particles (Tertiary Particles) of Silica

The secondary particles of foliar silica of the present invention is obtained by disintegrating tertiary agglomerated particles (tertiary particles) of silica (hereinafter referred to also as the tertiary agglomerated particles of silica in the present invention). Firstly, a process for producing the tertiary agglomerated particles of silica as the precursor particles will be described.

From the above-mentioned viewpoint, the present inventors have proposed, instead of a conventional method of using silica gel (silica xerogel) as the starting material, more preferred two methods for producing the tertiary agglomerated particles of silica in the present invention.

The first method is a method wherein a silica sol containing a silica source and an alkali source in prescribed amounts, i.e. an aqueous dispersion of colloidal silica, is used as the starting material, and this starting material is subjected to hydrothermal treatment, whereby tertiary agglomerated particles of silica such as silica-X can be produced on an industrial scale in a short period of time under a stabilized condition. This method has a merit in that agglomerates (the tertiary agglomerated particles in the present invention) which are tertiary particles formed by the secondary particles of foliar silica of the present invention, which are three dimensionally irregularly overlaid one on another to have pore spaces, can be obtained as they are.

This is a method wherein a silica sol containing a silica source and an alkali source in prescribed amounts, is subjected to hydrothermal treatment. As the silica sol, it is preferred to use a silica sol obtained by subjecting an aqueous alkali metal silicate solution having a silica/alkali molar ratio ($SiO_2/Me_2O$, wherein Me is an alkali metal such as Li, Na or K; the same applies hereinafter) of from 1.0 to 3.4 mol/mol, to alkali removal by an ion exchange resin method or an electrodialysis method. As the aqueous alkali metal silicate solution, one obtained by diluting water glass with a suitable amount of water, may, for example, be preferably employed.

The silica/alkali molar ratio ($SiO_2/Me_2O$) of the silica sol is preferably within a range of from 3.5 to 20 mol/mol, more preferably within a range of from 4.5 to 18 mol/mol. Further, the silica concentration in the silica sol is preferably from 2 to 20 mass %, more preferably from 3 to 15 mass %.

The particle size of silica in the silica sol means the average particle size, and it is not particularly limited. However, one having a particle size of at most 100 nm is preferred, and particularly preferred is one so-called active silicic acid having a particle size of at most 20 nm. The lower limit of the particle size is not particularly limited, but one having a particle size of at least 1.0 nm is preferred. If the particle size exceeds 100 nm, the stability of the silica sol tends to deteriorate, such being undesirable.

The method for measuring the silica particle size is not particularly limited so long as such particle size can be measured. For example, it can be measured by a particle size distribution measurement by means of a Coulter counter, a laser/scattering particle size distribution measuring apparatus, or a dynamic light-scattering particle size measuring apparatus, or a scale measurement for the sizes of particle images photographed by a transmission electron microscope.

As described above, the silica sol is used as the starting material, and this starting material is heated in a heat pressure container such as an autoclave to carry out the hydrothermal treatment to form the tertiary agglomerated particles of silica in the present invention.

The autoclave is not particularly limited with respect to its type and may be one equipped with at least a heating means and stirring means and preferably equipped further with a temperature-measuring means. Further, prior to charging the silica sol into an autoclave for thermal treatment, purified water such as deionized water or distilled water may be added to adjust the silica concentration within a desired range.

The hydrothermal treatment is carried out preferably within a temperature range of from 150 to 250° C., more preferably from 170 to 220° C., in order to increase the reaction rate as far as possible and to minimize the progress of crystallization.

The time required for the hydrothermal treatment may vary depending upon the temperature for the hydrothermal treatment or the presence or absence of seed crystals, but it is usually from 3 to 50 hours, preferably from 3 to 40 hours, more preferably from 5 to 25 hours.

Addition of seed crystals is not essential, but it is preferred to add seed crystals in an amount of from about 0.001 to 1 mass % in order to efficiently carry out the hydrothermal treatment and to shorten the treating time. As such seed crystals, silica-X, silica-Y or the like may be used as it is or after pulverization, as the case requires.

After completion of the hydrothermal treatment, the treated product is taken out from the autoclave, followed by filtration and washing with water. The particles after washing with water preferably have a pH of from 5 to 9, more preferably from 6 to 8, as formed into an aqueous slurry of 10 mass %.

On the other hand, the second method is one proposed by the present inventors. It is a method wherein silica hydrogel is used as the starting material, and the starting material is subjected to hydrothermal treatment in the presence of an alkali metal, which is a preferred method in that the tertiary agglomerated particles of silica in the present invention, such as silica-X or silica-Y, can be produced by a reaction at a lower temperature in a short period of time without formation of crystals such as quartz and yet in good field (JP-A-2000-72432).

Here, the silica hydrogel suitable for use as the starting material, is particulate silica hydrogel. The particle shape of the silica hydrogel may be spherical or an indeterminate particle shape, and the method for its granulation may optionally be selected.

For example, in the case of spherical silica hydrogel, as is well known, it may be formed by solidifying silica hydrosol into a spherical shape in a petroleum or in other media. More preferably, it can be produced by a method wherein an aqueous alkali metal silicate solution and an aqueous mineral acid solution are mixed to form a silica sol in a short time, and the silica sol is discharged in a gas medium and gelled in the gas, as disclosed in JP-B-48-13834.

Namely, an aqueous alkali metal silicate solution and an aqueous mineral acid solution are introduced into a container provided with a discharge outlet from separate inlets and uniformly mixed instantaneously to form a silica sol having a pH of from 7 to 9 and a concentration of at least 130 g/l as calculated as $SiO_2$ concentration, and the silica sol is immediately discharged from the above discharge outlet into a gas medium such as air and gelled in air while it is flying in air in a parabolic orbit. At the falling point, an aging tank containing water is placed, so that the gelled particles are permitted to fall thereinto and will be aged for from a few minutes to a few tens minutes.

An acid is added thereto to lower the pH, followed by washing with water to obtain a product which is spherical silica hydrogel which can be preferably used in the present invention.

This silica hydrogel is transparent spherical particles having a uniform particle size at a level of from 2 to 10 mm and having elasticity, and in one example, it contains water in an amount of about four times in a weight ratio to $SiO_2$ (i.e. $SiO_2$: about 20 mass %, water: about 80 mass %).

The silica hydrogel particles are agglomerates of numerous primary particles of silica having a particle size of about a few nm, and it is considered that such water is present on the surfaces and in spaces of such primary particles.

The $SiO_2$ concentration in the silica hydrogel to be used in the present invention is preferably from 15 to 75 mass % (i.e. the water content: from 85 to 25 mass %) from the viewpoint of the reactivity and easy availability, and the water content may be adjusted within this range by drying as the case requires. The water content in this silica hydrogel is one measured as follows. Namely, a sample of the silica hydrogel is dried at 180° C. for two hours, whereupon the mass of the remaining sample is taken as an absolutely dried $SiO_2$ amount, and the mass reduction is taken as the water content in the sample silica hydrogel.

A product contained by sufficiently drying such silica hydrogel particles by e.g. a dryer at a temperature of from about 150 to 180° C. to remove the water of the hydrogel from the spaces and the surfaces, corresponds dry silica gel (silica xerogel) which is industrially produced and sold. In the above-mentioned methods for producing conventional silica-X and silica-Y, such dry silica gel is used as the starting material silica for the hydrothermal treatment.

Using such silica hydrogel as the starting material, the hydrothermal treatment is carried out by heating it in a heat pressure container such as an autoclave in the same manner as the first method of using silica sol, to form the tertiary agglomerated particles of silica in the present invention. In such a case, such spherical silica hydrogel may be used as it is. However, preferably, it is pulverized or roughly pulverized to have a particle size of from about 0.1 to 6 mm, so that stirring in the autoclave can more efficiently be carried out.

When the silica hydrogel is charged into an autoclave for the hydrothermal treatment, it is preferred to add purified water such as distilled water or deionized water to adjust the silica hydrogel concentration within the desired range. The total silica concentration in the treating liquid in the autoclave is selected taking into consideration the stirring efficiency, the crystal growth rate, the yield, etc., but usually, it is from 1 to 30 mass %, preferably from 10 to 20 mass % as $SiO_2$, based on the total amount of the starting materials charged. Here, the total silica concentration in the treating liquid means the total silica concentration in the system and includes, not only silica in the silica hydrogel, but also silica brought in the system by sodium silicate, etc., when such sodium silicate, etc., are used as an alkali metal salt. The total silica concentration may be made higher than the first method wherein silica sol is used.

In the hydrothermal treatment, an alkali metal salt is incorporated to the silica hydrogel to adjust the pH of the treating liquid towards the alkaline side thereby to increase the silica solubility properly, whereby the precipitation rate based on so-called Ostwald aging is increased, and conversion of the silica hydrogel to silica-X, etc. is accelerated.

Here, the alkali metal salt means an alkali metal hydroxide, an alkali metal silicate or an alkali metal carbonate. As the alkali metal, Li, Na or K is preferred. The pH of the system is preferably at least pH 7, more preferably from pH 8 to pH 13, particularly preferably from pH 9 to pH 12.5.

As represented by the silica/alkali molar ratio ($SiO_2$/$Me_2O$, wherein M is an alkali metal), a preferred amount of alkali is within a range of from 4 to 15 mol/mol, more preferably within a range of from 7 to 13 mol/mol. As mentioned above, silica is represented by the total silica amount in the treating liquid within the system, which includes the silica brought in the system by the sodium silicate, etc., in addition to the silica of the silica hydrogel.

The hydrothermal treatment is carried out within a temperature range of from 150 to 220° C., preferably from 160 to 200° C., most preferably from 170 to 195° C.

If the temperature is substantially lower than this range, an extremely long time will be required to obtain the desired tertiary agglomerated particles of silica in the present invention. On the other hand, if the temperature is substantially higher than this range, the desired tertiary agglomerated particles of silica tend to be hardly obtainable in a single phase of silica-X, silica-Y or the like. As mentioned above, silica-X or the like is considered to constitute an intermediate phase or a metastable phase and tends to gradually undergo phase transfer to cristobalite or quartz as the hydrothermal treatment progresses, and at a high temperature, particularly in a case where the temperature exceeds 220° C., the crystallization rate tends to be high, whereby the product will be a mixture containing cristobalite or quartz, or the crystallization reaction is so quick that it can not be controlled, whereby all silica is likely to be changed into cristobalite or quartz.

The time required for the hydrothermal treatment varies depending upon the temperature of the hydrothermal treatment or presence or absence of seed crystals, but usually, it is from 3 to 50 hours, preferably from 5 to 40 hours, more preferably from 5 to 25 hours, most preferably from 5 to 12 hours. Addition of seed crystals is not essential, but in order to carry out the hydrothermal treatment efficiently and to shorten the treating time, it is preferred to add seed crystals in an amount of from about 0.001 to 1 mass %, based on the charged amount of the starting material silica hydrogel.

Like in the first method, as the seed crystals, silica-X, silica-Y or the like may be employed as it is or after pulverization as the case requires.

According to a study conducted by the present inventors, when silica-X is used as seed crystals, agglomerated particles made of silica-X are likely to be formed, and when silica-Y is used as seed crystals, agglomerated particles made of silica-Y are likely to be formed.

After completion of the hydrothermal treatment, like in the first method, the treated product is withdrawn from the autoclave, followed by filtration and washing with water to adjust the pH.

A cake of the hydrothermally treated product obtained by the first method of hydrothermally treating silica sol or the second method of hydrothermally treating silica hydrogel, as described above, is subjected to filtration and washing with water to obtain particles, and when such particles are observed by means of a scanning electron microscope (hereinafter referred to simply as "SEM"), it will be evident that they form agglomerated particles of silica which are tertiary particles formed by individual foliar secondary particles which are three dimensionally irregularly overlaid one on another to have pore spaces. Such agglomerated particles are the tertiary agglomerated particles of silica in the present invention.

However, as will be described later, by SEM, the primary particles which are extremely thin flaky particles, can not be identified, and only foliar secondary particles formed by a plurality of such primary particles as extremely thin flaky particles which are aligned face-to-face in parallel with one another, can be identified. On the other hand, by the observation by means of a transmission electron microscope (hereinafter referred to simply as "TEM"), the primary particles which are extremely thin flaky particles through which electron rays may partially pass, can be identified. Such foliar secondary particles are the secondary particles of foliar silica of the present invention, which can be identified as formed by a plurality of such primary particles which are overlaid face-to-face in parallel with one another. It is extremely difficult to peel and isolate the flaky primary particles as constituting units one by one from the foliar secondary particles constituted by the primary particles which are overlaid one on another to have a layered structure. Namely, in the layered overlaid structure of the primary particles, the interlayer bonding is extremely firm, and the layers are completely integrated. Thus, it is difficult to disintegrate the foliar secondary particles of the present invention into primary particles any more.

It is also possible to prepare the tertiary agglomerated particles of silica in the present invention by using hydrous silicic acid (so-called white carbon or the like) as the starting material in a manner similar to the above-mentioned method of employing silica sol or silica hydrogel.

Disintegration of the Tertiary Agglomerated Particles of Silica into Secondary Particles of Foliar Silica In the present invention, the tertiary agglomerated particles of silica prepared as described above, are disintegrated by various means to obtain the secondary particles of foliar silica of the present invention.

The secondary particles of foliar silica of the present invention can be obtained firstly as an aqueous slurry of the secondary particles of foliar silica (hereinafter referred to as "the secondary particle slurry of the present invention"). For example, the following method (a) or (b) may be selected for use.

(a) Method of disintegrating the tertiary agglomerated particles of silica in the form of an aqueous slurry form to obtain a slurry of the secondary particles of foliar silica of the present invention:

The tertiary agglomerated particles of silica obtained by the above described method in the form of an aqueous slurry, will then be subjected to washing with water and solid/liquid separation by means of an apparatus for solid/liquid separation and washing with water, such as a belt filter, a filter cloth type centrifugal separator or a decanter, and if necessary, further subjected to repulping with water, to obtain an aqueous slurry having a $SiO_2$ concentration of from 1 to 20 mass % and comprising the tertiary agglomerated particles of silica in the present invention having an average particle size of from 1 to 10 $\mu$m containing substantially no alkali metal salt.

By applying a specific mechanical method found by the present inventors (hereinafter referred to as "the mechanical disintegrating method") to the tertiary agglomerated particles of silica thus obtained in the form of an aqueous slurry, the tertiary agglomerated particles will be disintegrated into the secondary particles of foliar silica. Namely, the disintegration is carried out by supplying the above slurry to a wet system pulverizing apparatus (a disintegrating apparatus) such as a wet type ball mill or a wet type beads mill of a system wherein medium beads are employed for mechanical high speed stirring and subjecting the tertiary agglomerated particles of scaly silica to disintegrating treatment. At that time, it is desired that disintegration/dispersion is carried out without pulverizing or destroying the secondary particles of foliar silica as far as possible. Among the above-mentioned methods, particularly preferred is a wet system beads mill employing medium beads made of zirconia or alumina having a diameter of from 0.2 to 1.0 mm. Thus, by this disintegration step, the tertiary particles will be disintegrated to secondary particles. Namely, the obtained slurry is a slurry consisting essentially of the secondary particles of foliar silica of the present invention which contain substantially no tertiary particles and which are formed by a plurality of flaky primary particles which are overlaid one on another and aligned face-to-face in parallel with one another.

If the $SiO_2$ concentration in the silica slurry to be supplied to the wet system pulverizing apparatus, is less than 1 mass %, the solid concentration is so low that concentration in a subsequent step will be required, thus leading to a problem from the viewpoint of economical efficiency. On the other hand, if the $SiO_2$ concentration exceeds 20 mass %, the viscosity of the disintegrated slurry tends to be extremely high, thus leading to a problem from the viewpoint of the handling efficiency.

FIG. 1 is a SEM photograph of the secondary particles of foliar silica of the present invention thus obtained. By SEM, the foliar secondary particles can be identified, but extremely thin flaky primary particles can not be identified. From this photograph, it is evident that the secondary particles of foliar silica are present independent of one another without being agglomerated.

Figure 2:
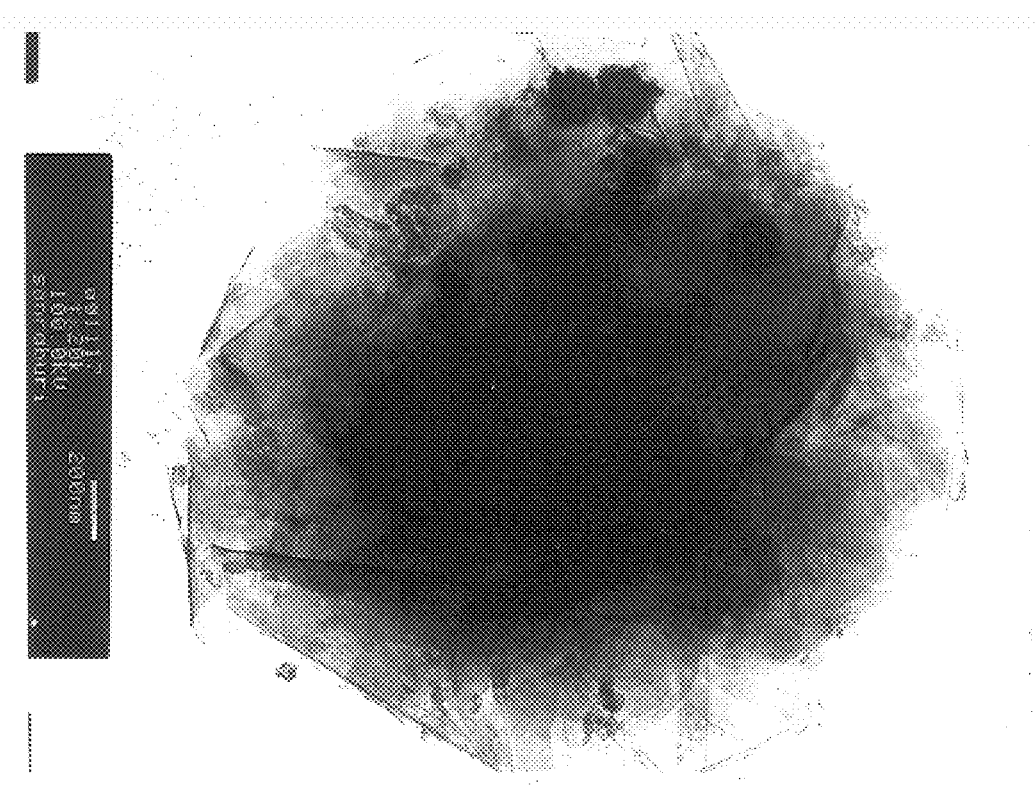
FIG. 2 is a transmission electron microscopic photograph showing the secondary particles of foliar silica of the present invention.

Further, FIG. 2 is a TEM photograph of the secondary particles of foliar silica of the present invention. By TEM, the extremely thin flaky primary particles and the foliar secondary particles formed by a plurality of such primary particles which are overlaid one on another and aligned face-to-face in parallels with one another, can be confirmed.

(b) Method of preparing a dry powder comprising the tertiary agglomerated particles of silica, followed by wet system pulverization (disintegration) thereof, to obtain a slurry of the secondary particles of foliar silica of the present invention:

The tertiary agglomerated particles of silica obtained by the above described process in the form of an aqueous slurry, will then be subjected to washing with water and solid/liquid separation by means of an apparatus for solid/liquid separation and washing with water, such as a belt filter, a filter cloth type centrifugal separator or a decanter, and if necessary, further subjected to repulping with water, to obtain an aqueous slurry having a $SiO_2$ concentration of from 1 to 30 mass % and comprising the tertiary agglomerated particles of silica having an average particle size of from 1 to 10 μm containing substantially no alkali metal salt.

In this case, before obtaining foliar secondary particles dispersed by wet type disintegration, it is firstly necessary to obtain by drying a fine powder of the tertiary agglomerated particles of silica in the present invention, dispersed and having an average particle size of from 1 to 10 μm. However, such tertiary agglomerated particles of silica have a specific nature such that during the drying operation, the agglomerated particles are very much likely to agglomerate one another. According to a study by the present inventors, when a medium fluidized bed dryer is employed as the drying apparatus, it is possible for the first time to obtain a dried fine powder of the tertiary agglomerated particles of silica having an average particle size of from 1 to 10 μm, which are sufficiently dispersed.

Whereas, when other drying apparatus, such as a flash drier, a spray drier, a fluidized bed drier, an agitation type drier, a cylinder drier, a box-type drier, a band drier, a hot air drier, a vacuum drier or a vibration drier, is employed, the tertiary particles tend to further agglomerate during drying into a particle form wherein no substantial pore spaces (voids or pockets) formed by irregular overlapping of the foliar secondary particles, are observed, and it is difficult to obtain the desired tertiary agglomerated particles of silica having an average particle size of from 1 to 10 μm, which are sufficiently dispersed.

Figure 3:
FIG. 3 is a scanning electron microscopic photograph showing the tertiary agglomerated particles of silica in the present invention.

FIG. 3 is a SEM photograph showing the tertiary agglomerated particles of silica in the present invention, thus obtained by drying by a medium fluidized bed drier. It is clearly observed that foliar secondary particles are overlaid one on another irregularly to form agglomerated particles of silica (tertiary particles) wherein numerous pore spaces (voids or pockets) formed by such irregular overlaying, are present. Such agglomerated particles may take a form which may be expressed variously depending upon the state on appearance, such as a cabbage-form, an onion-form, a petal-form, a bud-form or a snail-form.

Then, water and/or a liquid organic medium is added to the dried fine powder of the tertiary agglomerated particles of silica having an average particle size of from 1 to 10 μm, which are sufficiently dispersed, to obtain a slurry having a $SiO_2$ concentration of from 1 to 30 mass %.

In the same manner as in the above method (a), this slurry is supplied to a wet system pulverizing apparatus (a disintegrating apparatus) such as a wet system ball mill or a wet system beads mill of a system wherein pulverizing medium beads are employed for mechanical high speed stirring, whereby the tertiary agglomerated particles of silica are subjected to disintegrating treatment to obtain a slurry of the secondary particles of the present invention.

In the foregoing, the secondary particles of foliar silica of the present invention are obtained in the form of a slurry of the secondary particles. However, they may be obtained in the form of dried particles.

As a method for obtaining a dried fine powder of the secondary particles of foliar silica of the present invention (hereinafter referred to also as "the dried powder of the secondary particles of the present invention"), the following method (c) may, for example, be selected for use.

(c) Method of obtaining a dried powder of the secondary particles of the present invention from an aqueous slurry of the secondary particles of foliar silica of the above method (a):

Such a dried powder of foliar secondary particles monodispersed, is one required as a non-aqueous solvent type coating agent when the secondary particles of foliar silica having an average particle size of from 1 to 10 μm are to be used.

As mentioned above, an aqueous slurry of the secondary particles of foliar silica of the present invention as described in (a), has a specific nature such that during the drying operation, the particles are very much likely to agglomerate one another.

Accordingly, when a flash drier, a fluidized bed drier, a medium fluidized bed drier, an agitation type drier, a cylinder drier, a box-type drier, a band drier, a hot air drier, a vacuum drier, a vibration drier or the like is employed as a drying apparatus, the foliar secondary particles tend to agglomerate, whereby it is extremely difficult to obtain monodispersed secondary particles of foliar silica.

It has been found that in such a case, it is possible to obtain sufficiently dispersed foliar secondary particles having an average particle size of from 1 to 10 μm for the first time when an aqueous slurry comprising secondary particles of foliar silica of the present invention obtained by the method (a), is dried by means of a spray drier as the drying apparatus, and spray drying is carried out by adjusting the $SiO_2$ concentration in the feed slurry to a level of from 1 to 5 mass %, preferably from 1 to 3 mass %. If the $SiO_2$ concentration in the slurry supplied to the spray drier is less than 1 mass %, the amount of water to be evaporated tends to be excessive relative to the silica, such being problematic from the viewpoint of the economical efficiency. On the other hand, if the $SiO_2$ concentration in the slurry exceeds 5 mass %, agglomeration during the drying will be accelerated, whereby foliar secondary particles are likely to agglomerate, whereby monodispersed secondary particles of foliar silica will be hardly obtainable, Among the above-mentioned methods (a) to (c) for obtaining the secondary particles of foliar silica in the form of an aqueous solution, the method (a) for producing tertiary agglomerated particles of silica using silica hydrogel as the starting material and disintegrating an aqueous slurry of tertiary agglomerated particles of silica by a mechanical disintegrating method without requiring the drying step method (b), is preferred, since a constant product quality can be obtained, and the productivity is high.

As described above, the secondary particles of foliar silica having a film-forming property or a function as an adhesive to be used in the present invention, can be obtained by disintegrating the tertiary agglomerates of a H-type layered polysilicic acid by the above-mentioned mechanical disintegrating method.

It is observed that the average particle size after the disintegrating treatment is substantially small as compared with the size before the treatment, although the fundamental particle shape of the secondary particles of foliar silica is not substantially destroyed. Further, from the observation of the dispersed particles by SEM, it is evident that the secondary particles of foliar silica are present independent of one another.

Thus, as far as the present inventors are aware, the above-mentioned mechanical disintegration method is most suitable as a method for disintegrating the tertiary agglomerated particles of silica in the form of an aqueous solution of a layered polysilicic acid or a layered polysilicate, into secondary particles of foliar silica suitable for the present invention.

Whereas, heretofore, it has been proposed to chemically disintegrate and disperse such tertiary agglomerated particles by treatment with an aqueous solution of an alkali such as lithium hydroxide, potassium hydroxide or ammonium hydroxide (e.g., Kosuge Katsunori et al., Journal of the Ceramic Society of Japan, 100 (6), 872–875 (1992), Kosuge Katsunori et al., Zeolite 13 (3), 89–96 (1996), JP-A-6-104565) (hereinafter referred to as a "Chemical disintegrating method").

Particularly, in the above-mentioned JP-B-6-104565, it is proposed that magadiite and kenyaite which are alkali metal type layered polysilicates obtained by applying a chemical disintegrating method, are coated and dried on a substrate to form a film-form material, and then this film-form material is subjected to acid treatment and converted to a film-form material made of H-type layered polysilicic acid. However, the alkali metal type film-form material obtained by this method is a highly alkaline substance and thus has a problem that it can not be practically used as it is, and the formed film-form material must be treated with e.g. an aqueous acid solution.

On the other hand, the present inventors have studied the above-mentioned known chemical disintegrating method in detail in accordance with the method disclosed in the above publication using sodium-type kenyaite or the like as an example. As a result, they have confirmed that by such chemical disintegration method, particles of a form corresponding to the secondary particles of foliar silica to be used in the present invention, can not be obtained. Namely, when the particles after treatment by the chemical disintegrating method are observed by SEM, on appearance, the particles look like disintegrated, but when the particle size distributions before and after the dispersing treatment are measured by a particle size distribution measuring apparatus (such as a Coulter counter, a laser diffraction/scattering type particle size distribution measuring apparatus or a dynamic light scattering type particle size distribution measuring apparatus), no substantial change is observed in the particle size distribution as between before and after the above treatment, and no substantial decrease in the average particle size which should be observed due to the particle dispersion, has not been confirmed.

Further, the particles thus obtained by the chemical disintegrating method do not have a function to form a strong coating film under a room temperature drying condition, as opposed to the secondary particles of scaly silica of the present invention obtained by the mechanical disintegration method, probably due to the essential difference in the layered structure. Accordingly, they are essentially poor in a function to form a hardenable composition or an adhesive composition.

According to a study by the present inventors, at a stage of the tertiary agglomerated particles of silica, filtration and washing with water can be carried out easily by an industrial method, but as a problem from the viewpoint of the process, the aqueous slurry having such agglomerated particles disintegrated to a level of the secondary particles of foliar silica of the present invention, is extremely difficult to process by filtration, and at this stage, it is practically impossible to remove the co-existing dissolved salts by industrial filtration and washing with water.

Also from the foregoing reason, a method of firstly preparing tertiary agglomerated particles of silica from a H-type layered polysilicic acid, removing at that stage the co-existing dissolved salts by filtration and washing with water, and then mechanically disintegrating the agglomerated particles, as in the present invention, is considered to be most suitable.

Fundamental Physical Properties of the Secondary Particles of Foliar Silica

Now, the fundamental physical properties of the secondary particles of foliar silica of the present invention thus obtained, will be described.

The $SiO_2$ purity of the silica in the secondary particles of silica, is at least 99.0 mass %. The pH is from 6.0 to 8.0. The X-ray diffraction spectrum indicates a silica comprising silica-X characterized by the main peaks at $2\theta=4.9°$, $26.0°$ and $28.3°$ corresponding to a card (hereinafter referred to simply as ASTM card) number of 16-0380 registered in ASTM (American Society for Testing and Materials) of USA, and/or silica-Y characterized by the main peaks at $2\theta=5.6°$, $25.8°$ and $28.3°$, corresponding to an ASTM card number of 31-1233. As peaks other than the above, peaks of ASTM card numbers of 31-1234 and 37-0386 are observed in the case of silica-X, and peaks of ASTM card numbers of 35-63 and 25-1332, are observed in the case of silica-Y.

Further, with respect to the particle size, the average particle size by a Coulter counter (MA-II model, manufactured by Coulter Electronics Company) is from 1 to 10 $\mu$m, and the average particle size by a laser diffraction/scattering type particle size distribution measuring apparatus (LA-920 model, manufactured by Horiba Seisakusho K.K.) is from 0.01 to 10 $\mu$m.

The oil adsorption (JIS K5101) is from 100 to 150 ml/100 g.

When the pore distribution of the secondary particles of silica is measured by a BET method (BELSORP-28 model, tradename, manufactured by Nippon Bell Co.), the pore volume is from 0.05 to 0.15 ml/g, and the specific surface area is from 30 to 80 $m^2/g$.

It is especially noteworthy that with such secondary particles of silica, in the pore size distribution curve, a sharp large peak is observed in the vicinity of a pore diameter of from 2 to 6 nm, particularly in the vicinity of from 3.5 to 4.0 nm.

This indicates that a meso pore region (pores having pore diameters of from 2 to 50 nm i.e. a region in between micropores and macropores) exists distinctly. Namely, the secondary particles of foliar silica of the present invention have a laminated structure or a lamella structure wherein a plurality of flaky primary particles of scaly silica are overlaid one on another and aligned face-to-face in parallel with one another, and it is considered that pore spaces formed among the overlaid flaky particles, are measured as pores having the sizes within the above meso region.

Further, the infrared adsorption spectrum (FT-IR) of the silica ($SiO_2$ at room temperature, which is not heat-treated) indicates a silica having silanol groups having one adsorption band at each of from 3,600 to 3,700 $cm^{-1}$ and from 3,400 to 3,500 $cm^{-1}$.

The amount of silanol groups per specific surface area by a BET method, has a large value at a level of from 50 to 70 $\mu mol/m^2$ (a few times of silica gel), as obtained from a calculation formula of $(W \times 1111.1)/SA = SiOH(\mu mol/m^2)$, where W is a numerical value of the difference (mass %) in the mass reduction in equilibrium from heating at 120° C. to heating at 1,200° C., as obtained by a so-called heat weight method, and SA is a numerical value of the specific surface area ($m^2/g$) of a BET method.

Having silanol groups of such a high density, the secondary particles of silica of the present invention can easily be chemically modified, or a coating film formed of such secondary particles of silica may be heat-treated at a temperature of from 400 to 600° C. to let silanol groups react for e.g. condensation to improve the strength of the coating film.

With respect to the heat resistance of the secondary particles of foliar silica of the present invention, the secondary particles were heated in an air atmosphere at a temperature of from 500 to 1,000° C. for one hour, whereupon any change in form or size of the particles was observed by SEM, whereby no particular change was observed.

The saturated solubility at 20° C. of the secondary particles of silica in an aqueous acid solution and in an aqueous alkali solution is low. Namely, the dissolved $SiO_2$ concentration is 0.008 mass % in an aqueous solution containing 10 mass % of HCl, 0.006 mass % in deionized water, 0.55 mass % in an aqueous solution containing 5 mass % of NaOH and 0.79 mass % in an aqueous solution containing 10 mass % of NaOH, thus indicating that the secondary particles of silica have a small solubility in an acid or an alkali and thus have acid resistance and alkali resistance. Especially, as compared with silica gel or colloidal silica, they have a very small solubility in an aqueous alkali solution, thus indicating that they have good alkali resistance.

The secondary particles of foliar silica of the present invention are basically ones having a laminated structure as defined in claim 1.

By virtue of such a structure, they have a very unique self film-forming property and are capable of forming a strong silica coating film easily at normal temperature. For example, when a slurry of the secondary particles of the present invention (this is a hardenable composition containing a volatile liquid i.e. water and/or a volatile liquid (a volatile organic solvent or the like) other than water) is coated on a substrate made of e.g. stainless steel or glass and dried at normal temperature, it will be hardened without using any binder or a film-forming assistant, whereby a tough coating film will easily be formed. This coating film is extremely strong and can not be easily peeled.

Further, by forming a coating film having such characteristics between substrates, it can be used as an adhesive layer for bonding the substrates. Thus, the hardenable composition can be used also as an adhesive composition (bonding agent).

This is certainly a surprising phenomenon. For example, if an aqueous slurry of silica gel which is amorphous porous particles made of the same $SiO_2$ particles as in the present invention, is coated on a substrate in the same manner, a coating film will be formed, but this film is an unextremely brittle coating film unlike the extremely strong coating film made of a slurry of the secondary particles of the present invention, and it is easily disintegrated and falls off simply by gently touched by a hand and has no commercial value. Thus, the two show remarkable contrasts.

Such strong self film-forming property and the strength of the coating film formed, may be explained as follows.

Figure 4:
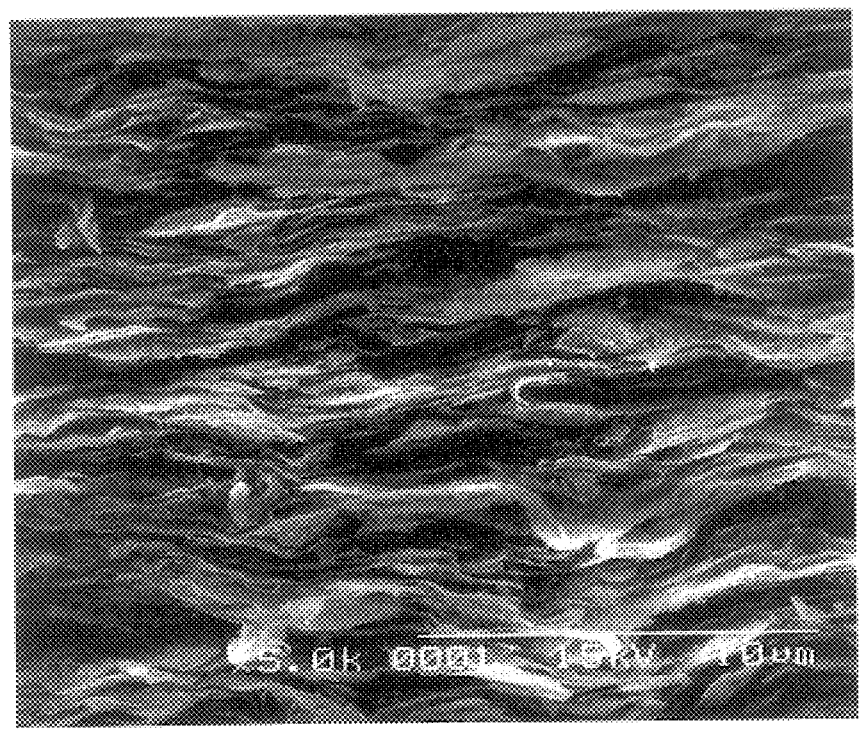
FIG. 4 is a scanning electron microscopic photograph of the cross section of the coating film made of the secondary particles of foliar silica of the present invention.

FIG. 4 shows a SEM photograph of the cross section of a coating film made of the secondary particles of foliar silica formed by coating and drying a slurry of the secondary particles of the present invention on a substrate. From this photograph, it is clearly observed that the secondary particles of foliar silica are composed basically of such particles which are laminated in parallel with one another, but more specifically, the respective particles have certain curvatures, and they are aligned in such curved states and densely overlaid one on another. As they are densely overlaid one on another in such a curved wavy fashion, it is considered that they are hardly slidable in a longitudinal direction (in a plane direction). Further, numerous fine irregularities are formed on the particle surfaces, and they are considered to engage one another like hooks to provide an anchoring effect like anchors or stick fasteners, whereby the particles are fixed also in the cross sectional direction (the direction perpendicular to the longitudinal direction), thereby to form a strong film as a whole.

Further, such secondary particles are formed by flaky primary particles which are overlaid one on another. Such flaky primary particles are strongly bonded and integrated to one another to such an extent that they are hardly peeled to independent flakes of constituting units by a usual means, to form the secondary particles of foliar silica of the present invention. This is considered to be the reason why the coating film made of the secondary particles of foliar silica of the present invention, formed by such primary particles as constituting units (i.e. so-called building blocks), is extremely strong. Further, in a case where such a coating film is formed between substrates so that it serves as an adhesive layer, the reason why such an adhesive layer is very strong may be explained by the same mechanism.

Further, the degree of alignment of the secondary particles of foliar silica in the hardened coating film coated on the surface of a substrate, can be measured by the following method. Namely, an X-ray diffraction pattern of the surface of a coating film peeled from a substrate by means of a razor, was compared with a powder X-ray diffraction pattern of a fine powder used to form the coating film.

In the case of silica-X as an example, the ratio of the two main peaks corresponding to ASTM card 16-0380, i.e. the ratio of the height of the peak at 2θ of 26.0° to the height of the peak at 2θ of 4.9°, had a small value at a level of from 0.0 to 0.5 with the coating film, while it was from 1 to 5 with the powder. This is considered to show distinct alignment of the crystal particles in the coating film. Here, the height of the peak means the height from the baseline of zero count.

Whereas, the particles (the tertiary agglomerated particles of silica) formed by the secondary particles of foliar silica of the present invention which are further overlaid three dimensionally irregularly, have no substantial self film-forming property, whereby it is impossible to form a strong coating film. FIG. 5 shows a SEM photograph of the cross section of a coating film made of the tertiary agglomerated particles of silica. However, in this case, the particle form is not basically foliar alike the secondary particles of the present invention, whereby the particles can not be densely overlaid when laminated one another, and it is clearly observed that a dense coating film can hardly be formed.

Further, a hardenable composition comprising the secondary particles of foliar silica of the present invention and a liquid organic medium which can be evaporated (this is also a slurry of the secondary particles of the present invention, and a volatile liquid corresponds to the liquid organic medium) likewise has a self film-forming property and will form a strong coating film easily by drying and hardening. The hardenable composition defined by the present invention, is capable of forming not only a coating film but also a hardened product of an optional shape by molding it, followed by drying and hardening. Such hardening can adequately be carried out simply by drying at room temperature, but the hardened product such as a coating film may be subjected to heat treatment to further improve the strength, as the case requires.

Case Wherein the Secondary Particles of Foliar Silica are Used Alone as an Adhesive Composition or a Hardenable Composition for a Coating Material or Agent In a state dispersed in a volatile liquid such as water and/or a volatile liquid (a volatile organic solvent or the like) other than water, i.e. in the form of an aqueous slurry and/or an organic solvent slurry, the secondary particles of foliar silica of the present invention can be used as a hardenable composition (or as an adhesive composition) to form a hardened product such as a coating film on a substrate of e.g. a metal, glass, ceramics or plastic. Here, the volatile liquid is water and/or an organic solvent which can easily be dried at a temperature of from room temperature to 200° C., preferably from room temperature to 100° C., more preferably from room temperature to 80° C., such as water, benzene, toluene, xylene, kerosene oil or light oil. Such a composition is a hardenable composition, or such a hardenable composition can be used as an adhesive. The $SiO_2$ concentration in such a composition is preferably from 1 to 80 mass %. In such a manner, the secondary particles of foliar silica can be used as an adhesive composition (adhesive agent) or a hardenable composition for a coating material or agent.

Case Wherein the Secondary Particles of Foliar Silica are Blended with Other Material, so that the Blend is Used as an Adhesive Composition or a Hardenable Composition for a Coating Material or Agent The secondary particles of foliar silica of the present invention can be used as a hardenable composition in a form which further contains a low volatile substance as will be described hereinafter, remaining as a liquid or solid in a hardened product of silica formed by a drying operation. Further, similarly, they can be used as an adhesive composition. Here, "by a drying operation" means that the volatile liquid, such as water and/or a volatile liquid (a volatile organic solvent or the like) other than water, is dried under the above-mentioned conditions.

Specifically, in a state dispersed in water or other organic solvent together with such a remaining substance, they are used as a hardenable composition for a coating material or agent to form a hardened product such as a coating film made of the secondary particles of silica and the remaining substance, by coating and drying them on a substrate of a metal, glass, ceramics, plastic, wood, cement hardened product, stone product, paper or leather. The shape or form of the substrate to be used in the present invention, is not particularly limited and may be any shape or form, such as a flat plate form, a curved surface form, a porous form, a fibrous form, a woven fabric form, a non-woven fabric form or a network structure form. Likewise, such a composition may be provided and dried between the above-mentioned substrates and thus can be used as an adhesive to form an adhesive layer containing the remaining substance together with the secondary particles of silica.

In such a hardenable composition or an adhesive, the $SiO_2$ concentration is preferably from 0.1 to 60 mass %.

Such a low volatile substance remaining in a hardened product after drying, may, for example, be a liquid substance having a high boiling point, such as a terpene compound, a saturated hydrocarbon having at least 12 carbon atoms, or glycerol. Further, as other examples, ① an organic polymer substance or a precursor substance capable of forming an organic polymer substance by a polymerization reaction, may be mentioned. Such an organic polymer substance may be a resin emulsion-form substance.

As another example, the remaining low volatile substance may be a functional material or a functional substance which provides a certain function. When such a functional substance is solid, it may be in the form of fine particles or colloidal particles, and its form is not particularly limited. For example, such a substance may be ② a substance having a function to adsorb and desorb e.g. moisture, or ③ a substance having a catalytic function, more specifically, a substance having a photo oxidation catalytic function, most preferably titanium oxide.

Further, the low volatile substance remaining in the hardened product may be ④ a substance having an optical function. Preferably, such a substance is a substance having an ultraviolet ray-shielding function, most preferably fine particles of one or more members selected from the group consisting of titanium oxide, zinc oxide, cerium oxide, iron oxide and zirconium oxide.

Still further, the low volatile substance remaining in the hardened product may be ⑤ a metal compound, such as amorphous silicon dioxide different from the scaly silica in the present invention, and/or a metal compound other than silicon dioxide. Particularly, such a metal compound is amorphous silicon dioxide different from the scaly silica of the present invention, such as silica gel or amorphous silicon dioxide obtainable from an alkoxide of silicon. Such a metal compound may be in the form of colloidal particles. Particularly preferably, such colloidal particles are colloidal silica. Naturally, such a metal compound will be contained as a remaining substance in the formed hardened product.

Here, the colloidal particles in the hardenable composition will be present in the hardened product as ultrafine particles having an average particle size of from 1 to 200 nm which is substantially the same as the size of the colloidal particles in a colloidal state. The colloidal particles in the hardened product should be understood to have such meaning.

Case Wherein the Secondary Particles of Foliar Silica are Used Alone or in Combination with Other Material as a Hardenable Composition for Molding by Wet System Molding or Dry System Molding The secondary particles of foliar silica of the present invention are capable of not only forming a coating film but also forming an optional molded product, when hardened in a prescribed mold.

Namely, the secondary particles of foliar silica of the present invention may be kneaded in the presence of water or other volatile solvent, then molded by a molding means such as compression molding or extrusion molding and then dried and hardened to obtain a molded product. In such a case, the $SiO_2$ concentration in the composition is from 1 to 80 mass %, preferably from 20 to 80 mass %.

Otherwise, such secondary particles of silica may be kneaded after hardening together with the material substance remaining in the molded product, in the presence of water or other organic solvent, and then molded in the same manner to obtain a molded product. These methods are so-called wet system molding.

Further, instead of the above-mentioned wet system molding, the secondary particles of foliar silica of the present invention may be mixed alone or together with other material in a dry system and used as a hardenable composition for dry system molding, which will be formed into a molded product by dry system molding such as tablet molding. In this case, the $SiO_2$ content in the composition is from 1 to 100 mass %.

II. Curable Composition or Hardened Product Having Various Functions Containing or Consisting of the Secondary Particles of Foliar Silica As described above, the secondary particles of foliar silica of the present invention may be used alone or as blended with other material, particularly a functional material, as a hardenable composition in the field of e.g. a coating material or agent, a molded product or an adhesive composition (a bonding agent), and they are useful for the production of a hardened product including a coating film having various functions.

Namely, the secondary particles of foliar silica of the present invention are not only useful for forming a strong hardened product such as a coating film by themselves, but also useful in various fields in combination with functional materials such as functional fine particles, so that on the basis of the binder function based on the specific self film-forming property of the secondary particles of silica, the functional materials are firmly supported by the secondary particles of silica, while aligning them in the coating film, to improve the performance of an organic coating material or to provide a thermal function, an optical function, an electrical or magnetical function, an adsorption function, a catalytic function, a biological terial function, an aromatic or deodorant function or the like.

Further, as one of the basic applications of the secondary particles of foliar silica of the present invention, they may be incorporated to an organic coating material to improve the performance of the coating material.

Namely, such particles may be used as blended to an organic polymer material in an aqueous emulsion form, such as at least one homopolymer resin type material selected from the group consisting of an acrylic resin type, an epoxy resin type, a urethane resin type, a styrene resin type, a silicon resin type, a fluorine resin type, a vinyl chloride resin type and a polyester resin type, a copolymer resin type material made of at least two types of them, or a mixture or composite material comprising at least two types of such homopolymer resin materials and copolymer resin materials, to improve the hydrophilic property or weather resistance, to improve the moisture permeability or air permeability or to improve flame retardancy.

Now, general matters with respect to formation of the hardenable composition will be summarized. A mixing means for mixing the secondary particles of silica of the present invention with a solvent and/or other functional material, etc. to form a composition, is not particularly limited, and for example, a mechanical stirring and mixing means employing stirring vanes for a slurry may be used. As the stirring vanes, paddle-type, propeller-type, turbine-type, anchor-type or Faudlar-type stirring vanes may suitably be used, but useful stirring vanes are not limited thereto. Further, said other functional material may be in a dry powder form, a solution form, an emulsion form, a colloidal liquid form or a wet cake form, and the form is not limited.

Further, the means for blending the secondary particles of silica with other material in the presence of a solvent to uniformly disperse them to form a hardenable composition or the like, is not particularly limited, but a wet system beads mill or a wet system ball mill may, for example, be optionally used.

Furthermore, the means for kneading the secondary particles of silica of the present invention alone or together with other functional material in the presence of water or other organic solvent, may, for example, be a kneader.

The means for molding the hardenable composition of the present invention containing the secondary particles of silica, prepared as described above, is not particularly limited, and a commonly employed means such as a dewatering press molding machine, an extrusion molding machine, an extrusion granulating machine or a spherically granulating machine may be employed.

Further, the means for coating the hardenable composition on a substrate to form a coating film, is not particularly limited, and a means to be used for coating a usual coating material, such as coating by a brush, coating by a bar coater, spray coating or electrostatic coating, may be employed.

Also the means for drying after the coating is not particularly limited, and a means useful for a usual coating material, can be used. The drying temperature varies depending upon the particular purpose, but it is usually from about room temperature to 600° C., and the drying time is from 1 to 100 hours in the case of room temperature drying, and from about 5 minutes to two hours in the case of drying at a temperature of from 50 to 200° C.

Still further, the means for dry system molding after mixing the dry powder of the secondary particles of silica of the present invention alone or in combination with other dried powder material, is not particularly limited, and a commonly employed means such as a tablet molding machine, a roller-type pelleter, or a press molding machine may be employed.

As described above, the secondary particles of foliar silica of the present invention can be used for various applications, and now, more details will be explained.

(1) Use as an Adhesive Composition (Bonding Agent)

Firstly, a method of using the secondary particles of foliar silica of the present invention as an adhesive composition between substrates will be described.

The substrates to be bonded may be of the same types or different types of materials, such as metals, plastics, glasses, ceramics, cement hardened product, woods or papers.

The means for coating an adhesive composition containing the secondary particles of silica of the present invention on the substrates to be bonded to form a bonded structure (hereinafter referred to also as a bonded body), is not particularly limited, and a means commonly used for coating may be employed, such as manual coating, coating by a brush, coating by a bar coater or spray coating. Also the means for drying after the coating is not particularly limited, and a means used for usual drying, can be employed.

The adhesive composition of the present invention is basically a composition comprising scaly silica particles having a laminated structure, consisting essentially of secondary particles of foliar silica, and a volatile liquid. Further, it may be used in combination with other substance having an adhesive function. For example, when the volatile liquid in the composition is water, it may be used in combination with at least one member selected from the group consisting of an aqueous alkali metal silicate solution, colloidal silica, a water-soluble polymer and an organic polymer substance in an aqueous emulsion form.

In such a case, the aqueous alkali metal silicate solution preferably has a solid content concentration of from 1 to 60 mass % and a silica/alkali molar ratio ($SiO_2/Me_2O$, wherein Me is an alkali metal such as Li, Na or K) of from 0.1 to 3.8 mol/mol, more preferably from 0.5 to 3.8 mol/mol, particularly preferably from 1.0 to 3.8 mol/mol.

Further, in a case where the volatile liquid in the adhesive composition is an organic solvent, it may be used as mixed with ethyl polysilicate, an organo alkoxy silane or the like. It is particularly preferred to use it as mixed with an aqueous adhesive such as an aqueous alkali metal metal silicate solution or silica sol, since the handling will be easy. Particularly, an aqueous alkali metal silicate solution is preferred, since the strength of the adhesive layer can be further improved.

As already mentioned above, an aqueous adhesive containing colloidal silica or the like can hardly form a thick adhesive layer alone, and if the adhesive layer is made thick, there will be a problem that the bond strength tends to be non-uniform. However, by mixing the adhesive composition consisting essentially of the secondary particles of foliar silica of the present invention and the aqueous adhesive containing colloidal silica or the like, it becomes possible to form a thick adhesive layer, and it becomes possible to obtain adequate bond strength constantly. A merit in forming a thick adhesive layer is that secure bonding will be possible even when the surface of the substrates to be bonded is a rough surface i.e. not a surface having high surface precision.

As the water-soluble polymer, polyvinyl alcohol, polyvinyl pyrrolidone, methyl cellulose, carboxy methyl cellulose or gelatin may, for example, be used.

The proportion of the solid content in the adhesive composition in a slurry form of the present invention, is from 1 to 30 mass % in a case where the secondary particles of foliar silica are used alone, from 1 to 50 mass % in a case where colloidal silica is mixed to the secondary particles of foliar silica, from 1 to 30 mass %, in a case where an alkali metal silicate is mixed, and from 1 to 30 mass % in a case where a water-soluble polymer is mixed. Further, as the volatile liquid, water is most preferred.

To the adhesive composition of the present invention, other binders, fillers, additives, etc. may further be incorporated.

In the present invention, colloidal silica is silica particles having a particle size of at most 100 nm, preferably at most 50 nm, more preferably at most 10 nm and at least 1 nm and is sol particles contained in silica sol or colloidal silica. The particle size of such silica particles is a value measured by a dynamic light scattering method (a laser beam scattering method), and the particle shape may be any shape such as an isotropic shape such as a substantially spherical shape, a chain-shape or an anisotropic shape.

Thus, in a case where the adhesive composition of the present invention contains at least one member selected from the group consisting of colloidal silica, an aqueous alkali metal silicate solution and a water-soluble polymer, the ratio of the total mass of the solid content in the colloidal silica other than the secondary particles of foliar silica and/or the aqueous alkali metal silicate solution and/or the water-soluble polymer, to the total mass of the solid content in the secondary particles of foliar silica, the colloidal silica and/or an aqueous alkali metal silicate solution and/or the water-soluble polymer, is preferably from 2 to 90 mass %, preferably from 5 to 85 mass %, as calculated as the solid content.

The thickness of the adhesive layer between the substrates to be bonded is basically from a few $\mu$m to a few hundreds $\mu$m. However, if desired, it may be used in a thickness of a few tens mm as so-called putty or sealant at a joint or the like.

Further, with the adhesive composition of the present invention, particularly when it consists essentially of the secondary particles of foliar silica, if the substrates to be bonded are paper, a surprising peculiar phenomenon is observed such that the bond strength of the adhesive layer shows an extremely high anisotropy.

Namely, when the adhesive composition of the present invention is coated along the edges of two sheets of paper, and then dried, the bonded structure thereby obtained shows a high bond strength to such an extent that the papers break by the tension in the direction horizontal to the surface of paper (slipping direction), while the adhesive layer can extremely easily be peeled by a peeling force in the direction perpendicular to the paper surface.

This phenomenon is considered to be such that when two sheets of paper having the edges bonded are peeled in the direction perpendicular to the paper surface, since paper is a flexible substrate material to be bonded, large bending deformation will be exerted directly to the adhesive layer, whereby the adhesive layer is destroyed, and the sheets of paper will be easily peeled by the force in the direction perpendicular to the paper surface, while no substantial bending deformation will be exerted to the adhesive layer by the tensile force in the horizontal direction of the paper surface.

The adhesive composition of the present invention has a peeling characteristic based on such a peculiar anisotropy, whereby it can be used as a readily peelable adhesive for a flexible adherend such as paper or for an application of provisional bonding.

(2) Application to Heat Insulating Coating Material

The secondary particles of foliar silica of the present invention are excellent in heat resistance and accordingly useful for a heat insulating coating material i.e. as a hardenable composition for forming a heat insulating coating.

This is a heat insulating coating composition prepared by blending the secondary particles of foliar silica of the present invention with a volatile liquid and a material having a heat insulating function, for example, at least one material having a heat insulating function selected from the group consisting of micro-balloons, porous particles and fibrous materials. In addition to the above, at least one member selected from the group consisting of colloidal silica, an aqueous alkali metal silicate solution, an organic polymer substance in an aqueous emulsion form and a water-soluble polymer aqueous solution, may be incorporated. Further, a flame retardant may be incorporated.

Here, the above micro-balloons may, for example, be balloons made of inorganic material (ceramic balloons) such as glass balloons, silica balloons, silas balloons, zirconia balloons or alumina silicate balloons, or balloons made of an organic polymer material (plastic balloons). The porous particles may, for example, be xonotlite, porous silica gel, foamed silica gel, expanded vermiculite, or expanded perlite. The fibrous materials may, for example, be heat insulating inorganic fibers (such as silica aluminum fibers).

As the micro-balloons, glass balloons are most preferred, since the heat insulating property of the balloons is high, and the mechanical strength is high. The average particle size of the glass balloons is from 1 to 100 $\mu$m, and glass balloons having an average specific gravity of particles of from 0.1 to 1.0, are more preferred, since a smooth coating film can easily be formed, and the insulating property is high. Most preferred is glass balloons having an average particle size of from 1 to 80 $\mu$m and an average specific gravity of particles of from 0.10 to 0.8, whereby a more smooth coating film can easily be formed, and the heat insulating property is high.

Further, the colloidal silica is silica particles having a particle size of at most 100 nm, preferably at most 50 nm, more preferably at most 10 nm and at least 1 nm and is sol particles contained in the colloidal silica or silica sol. The particle size of such silica particles is the value measured by a dynamic light scattering method (a laser beam scattering method), and its particle shape may be any shape, such as an isotropic shape such as a substantially spherical shape, a chain-shape or an anisotropic shape.

Further, as the water soluble polymer substance, polyvinyl alcohol, polyvinyl pyrrolidone, polyacrylic acid, sodium polyacrylate, potassium polyacrylate, methyl cellulose, carboxy methyl cellulose, a water-soluble phenol type resin or gelatin may, for example, be used.

Further, the organic polymer substance in an aqueous emulsion form is at least one type of homopolymer resins selected from the group consisting of an acrylic resin type, an epoxy resin type, a urethane resin type, a vinyl chloride resin type, a phenol resin type, a silicon resin type, a fluorine resin type and a polyester resin type, a copolymer resin made of at least two types thereof, or a mixture or composite comprising at least two types of such homopolymer resins and copolymer resins.

Such a hardenable composition for a heat insulating coating material is one which is coated on the surface of a substrate (such as metal, glass, ceramics, cement hardened product, plastics, wood or paper as well as a woven fabric or non-woven fabric), dried and, if necessary, heat-treated, to evaporate the volatile liquid, to form a coating layer or a coating film made of a heat insulating hardened product bonded to the substrate surface.

The means for coating the hardenable composition for a heat insulating coating material of the present invention on a substrate may be a means which is commonly used for coating, such as manual coating, troweling, coating by a bar coater, spraying or blasting.

The thickness of the coating is not particularly limited, but it is usually from 0.1 to 50 mm, preferably from 0.2 to 20 mm.

The proportion of the solid content in the hardenable composition for a heat insulating coating material of the present invention is from 1 to 30 mass % in a case where the secondary particles of foliar silica are used alone as a binder, from 1 to 50 mass % in a case where the secondary particles of foliar silica and colloidal silica are used as a binder, from 1 to 30 mass % in a case where the secondary particles of foliar silica and an alkali metal silicate are used as a binder, and from 1 to 30 mass % in a case where the secondary particles of foliar silica and a water-soluble polymer are used as a binder. As the volatile liquid, water is most preferred.

When the secondary particles of foliar silica are used alone as a binder, the ratio (mass ratio) thereof to the material having a heat insulating function (such as microballoons, porous particles or fibrous materials) is from 95:5 to 5:95, preferably from 90:10 to 10:90.

Thus, when the hardenable composition for a heat insulating coating material of the present invention contains at least one member selected from the group consisting of colloidal silica, an aqueous alkali metal silicate solution, a water-soluble polymer substance and an organic polymer substance in an aqueous emulsion form, the ratio of the total mass of the solid content in the colloidal silica other than foliar silica and/or the alkali metal silicate and/or the water-soluble polymer and/or the organic polymer in an aqueous emulsion form to the total mass of the solid content in the secondary particles of foliar silica, the colloidal silica and/or the alkali metal silicate and/or the water-soluble polymer and/or the organic polymer in an aqueous emulsion form, is preferably from 2 to 90 mass %, more preferably from 5 to 85 mass %, as calculated as the solid content.

(3) Coating Film Containing Functional Fine Particles

In the present invention, functional fine particles may be used as a constituting component to form a hardened coating film, together with scaly silica particles. Here, as the functional fine particles, the following may, for example, be mentioned.

Firstly, as a typical example, a case where functional fine particles are pigments, may be mentioned. For example, coloring pigments to be usually incorporated to coating materials or coating agents may be mentioned including inorganic pigments, such as zinc white (zinc oxide), titanium white (titanium dioxide), carbon black, iron black ($Fe_3O_4$), iron oxide red ($Fe_2O_3$), chrome yellow (lead chromate), yellow ocher (natural material), iron blue ($Fe_4[Fe(CN)_6]_3 \cdot nH_2O$), ultramarine blue ($Na_6Al_6Si_6O_{24}Sx$), chrome vermilion (mixed crystal of lead chromate and lead sulfate), and metal fine powder, and various organic pigments, such as lake pigments and toners.

On the other hand, the functional fine powders may be a pigment so-called an extender to be incorporated to a usual coating material or a coating agent. This is a pigment which is used alone or together with a coloring pigment for the purpose of filling, reinforcing or delustering and which has no substantial coloring power by itself. For example, alumina, alumina white, clay, gypsum, kaolin, talc, mica, calcium carbonate, barium sulfate, barium carbonate, magnesium carbonate, gloss white, bentonite or white carbon (precipitated silica) may be mentioned.

Further, other functional fine particles include, in addition to the above-mentioned functional fine particles (such as glass balloons) having a thermal function (such as a heat-insulating function, functional fine particles (such as titanium oxide or zinc oxide) having an optical function (a ultraviolet ray-shielding function), functional fine particles (such as metal fine powder) having an electrical or magnetical function (an electrical wave-absorbing function or electromagnetic wave-shielding function), functional fine particles (such as silica gel or active carbon) having adsorbing and/or desorbing function, functional fine particles (such as anatase type titanium oxide) having a catalytic function (a photo oxidation catalytic function), functional fine particles having an biological function (such as an antibacterial function), fine particles having an aromatic or deodorant function and functional fine particles to be used for imparting a function to protect a substrate made of glass or plastic from mechanical or chemical damage, as will be described in detail hereinafter. Two or more different types of these functional fine particles may be used in combination.

In any case, the mass content as calculated as the solid content of the total amount of the secondary particles of foliar silica and the functional fine particles in the hardened coating film is preferably from 2 to 100 mass %, and the mass content as calculated as solid content of the functional fine particles in the hardened coating film is at least 0.5 mass %, preferably at least 10 mass %.

Now, each function will be described.

Coating or Coating Material Having an Optical Function

The secondary particles of foliar silica of the present invention may be utilized for a coating or coating material having an ultraviolet ray-shielding function in combination with an organic type ultraviolet ray-shielding agent or an inorganic type ultraviolet ray-shielding agent (such as titanium oxide, zinc oxide, cerium oxide, iron oxide or zirconium oxide). Further, such silica particles may be utilized for a coating or coating material having a light-selective transmission function such as infrared ray adsorption in combination with functional fine particles of e.g. a light selective transmission functional material (such as tin oxide or a composite metal hydroxide-condensed silicate). Likewise, they may be utilized for forming a coating or a coating material having a fluorescent function in combination with functional fine particles having a fluorescent function such as a fluorescent pigment or a phosphor.

Further, the secondary particles of foliar silica of the present invention may be used for an application to so-called frost coating wherein coating is applied to the exterior of a transparent container made of glass or plastic, by blending them with an organic polymer substance in an aqueous emulsion form. This serves not only to maintain the strength of the container but also to adjust the total transmittance and the diffuse transmittance of light to proper ranges by the hardened coating film thereby to impart an obscure glass tone to the container and thereby to present a distinguished high grade graceful impression for the content (such as an expensive wine or the like).

Coating or Coating Material having an Electrical or Magnetical Function

The secondary particles of silica of the present invention may be used for a coating or coating material having an electrical insulating property. Further, such silica particles may be used for a conductive or antistatic coating or coating material in combination with an electroconductive material or antistatic material. Further, such silica particles may be used as a coating or coating material having an electric wave-absorbing function or an electromagnetic wave-shielding function in combination with a filler material (such as metal fine powder, carbon powder or ferrite powder) for imparting an electric wave-absorbing function or an electromagnetic wave-shielding function. Further, such silica particles may be used for a coating or coating material having a certain specific dielectric constant in combination with a material having a specific dielectric constant.

Coating or Coating Material having an Adsorbing Function

The secondary particles of silica of the present invention may be used for a coating or coating material or a hardened product having a moisture adsorbing or moisture adsorbing and desorbing function, in combination with functional fine particles such as a moisture adsorber such as silica gel or synthetic zeolite (such as Na-A type zeolite or Ca-A type zeolite). In an application for moisture adsorption only, such a coating, coating material or hardened product, may be used, for example, as an inner drying agent for a double layered glass.

Still further, the secondary particles of silica may be used for a coating, coating material or hardened product having a gas-adsorbing function in combination with functional fine particles such as a material having a gas-adsorbing function (such as active carbon, alkaline earth metal-substituted A type synthetic zeolite, alkaline earth metal-substituted X-type synthetic zeolite, silica gel or silica/alumina gel). Further, the secondary particles of silica may be used as a particle binder (binder) for molded particles of various adsorbing agents.

Further, the secondary particles of silica of the present invention may be used as a particle binder for fine particles of silica gel (the particle shape may be spherical or indefinite) for liquid chromatography, so that a coating film is formed on a substrate, which can be used as a separating material for thin layer chromatography. At that time, in order to improve the developing rate of a developing solvent, a water-soluble polymer such as polysodium acrylate, polyvinyl alcohol or polyvinyl pyrrolidone may be used in combination with the secondary particles of silica of the present invention, as a particle binder.

Coating and Coating Material having a Catalytic Function

The secondary particles of silica of the present invention may be used as a coating or coating material having a catalytic function in combination with functional fine particles such as a catalytic material (such as a photo oxidation catalytic material such as titanium oxide). Further, such silica particles may be used as a particle binder for various catalyst particles. Further, the formed coating film may be heated at a temperature of from 200 to 600° C., as the case requires, to improve the strength or the water resistance of the coating film.

In the above-mentioned application to a particle binder for a photo oxidation catalyst, the secondary particles of foliar silica of the present invention may be used in combination with anatase type titanium dioxide (a dried powder or an aqueous colloidal liquid of fine particles) to be useful for an application to a photo oxidation catalyst and to photocatalytically make the surface ultra hydrophilic. Further, by utilizing the self film-forming property of the secondary particles of silica of the present invention, a coating film comprising such particles and titanium oxide is formed on the surface of a packing material having light transmitting property (such as Raschig rings made of glass), which can be used as a catalyst for water treatment to remove BOD or COD of waste water.

Coating or Coating Material having a Biological Function

The secondary particles of silica of the present invention may be used for a coating or coating material having an antibacterial function in combination with a particle material having an antibacterial function (such as metal silver, a silver compound, a silver-substituted synthetic zeolite or a zinc-substituted synthetic zeolite). Further, such silica particles may be used for a coating or coating material having an antimold function in combination with an antimold agent. Further, such silica particles may also be used for other biological applications (such as a ship bottom anti-fouling paint, an aquatic nutrition releasing substrate or a cell culture substrate).

Coating or Coating Material having an Aromatic or Deodorant Function

The secondary particles of silica of the present invention may be used for a coating or coating material having an aromatic or deodorant function in combination with a particle material having an aromatic or deodorant function.

In the foregoing, examples for coating films containing various functional fine particles have been described. Although not containing functional particles as described above, as another application of a coating film made of the secondary particles of silica of the present invention, a hardened coating film made of the hardenable composition of the present invention may be formed on a plastic substrate (a film or a sheet), so that it serves as a kind of a hard layer to improve the scratch resistance of the substrate. Further, heretofore, a photo oxidation catalytic layer containing a photo oxidation catalyst such as titanium oxide has been formed on a plastic substrate. By providing a hardened coating film of the present invention as an interlayer or a protective layer between the photo oxidation catalytic layer and the plastic substrate, it is possible to provide a function to prevent the plastic substrate from deterioration by a photo catalytic reaction by direct content of the substrate with the photo oxidation catalyst.

With Respect to Particle Binder

The secondary particles of foliar silica in the present invention not only have the self film-forming property but also exhibit a remarkable particle binding effect (a binder effect) by themselves, and such secondary particles of foliar silica are able to form together with the above-mentioned functional fine particles a strong hardened coating film. The coating film of the present invention may further contain another particle binder. When such another particle binder is incorporated and used in combination with the secondary particles of foliar silica, the particle binding action to the functional fine particles can further be improved. In the present invention, such a binder to be incorporated to the secondary particles will be referred to as a "particle binder" or a "binder".

Such a particle binder is most typically at least one member selected from the group consisting of an organic polymer material, colloidal silica and an alkali metal silicate.

The organic polymer material as such a particle binder, is not particularly limited, but may, for example, be at least one type of homopolymers selected from the group consisting of an acrylic resin type, a urethane resin type, a silicon resin type, a styrene resin type, an epoxy resin type, a fluorine resin type, a vinyl chloride resin type and a polyester resin type, or a copolymer resin of at least two types selected therefrom, or a mixture or composite comprising at least two types of such homopolymer resins and copolymer resins.

When such an organic polymer material is to be used in the present invention, one in the form of an aqueous emulsion is preferred, since handling is easy.

Among them, as an organic polymer material which is capable of imparting particularly good water resistance in the after-mentioned abrading water resistance test, at least one type of homopolymers selected from the group consisting of a (meth)acrylic resin type, an urethane resin type and a silicon resin type, or a copolymer resin of at least two types selected therefrom, or a mixture or a composite comprising at least two types of such monomer resins and copolymer resins, is preferred.

Further, a so-called acrylic silicon resin emulsion having alkoxy silyl groups in the emulsion particles of a (meth) acrylic resin type, is most preferred.

In the present invention, the amount of the organic polymer material as a particle binder as calculated as the solid content in the hardened coating film is preferably from 1 to 40 mass %.

Further, when colloidal silica is used as a binder, one in the form of a slurry is preferred wherein fine particles of amorphous silica having spherical or indefinite particle shape having an average particle size of from a few nm to 100 nm, are stably dispersed in water in a solid content concentration of from 20 to 50 mass % (such as Cataloid-S, tradename, Shokubai Kasei Kogyo K.K., or Snowtex, tradename, Nissan Chemical Industries).

The amount of colloidal silica as calculated as the solid content in the hardened coating film, is preferably from 1 to 40 mass %.

Further, when an alkali metal silicate is used as a particle binder, it is used in the form of an aqueous solution of at least one alkali metal silicate selected from the groups consisting of sodium silicate, potassium silicate and lithium silicate.

The amount of the alkali metal silicate as a particle binder as calculated as the solid content in the hardened coating film, is preferably from 1 to 40 mass %.

(4) Use as a Highly Transparent Hardened Coating Film

The hardened coating film containing the secondary particles of foliar silica of the present invention can be made to be a highly transparent coating film.

In the present invention, with a coating film comprising an organic polymer material and the secondary particles of foliar silica, formed on the surface of a substrate of e.g. a metal, plastic, glass or ceramics, basically, as the ratio of the secondary particles of foliar silica as a filler to the total solid content (the organic polymer material+the secondary particles of foliar silica) increases, the hardness of the coating film (such as an evaluation value by a pencil hardness test) improves, and the adhesion of the coating film to the substrate (such as an evaluation value by a cross-cut test) shows a high level.

However, if the ratio of the secondary particles of foliar silica becomes high, there will be a problem that the transparency and the gloss of the hardened coating film will decrease, and in some cases, the coating film will be opaque. When the hardened coating film of the present invention is used for various practical applications, it is basically preferred from the viewpoint of the appearance that the coating film is as transparent as possible.

The above problem can effectively be solved by the following methods.

A first method is one wherein a transparent overcoat layer consisting essentially of an organic polymer material is formed on a coating film containing the secondary particles of foliar silica, to obtain a coating film having the transparency of such coating film improved. Here, "essentially" means that the overcoat layer may contain a small amount, for example, within a range of less than 5 mass %, of a crosslinking agent, a plasticizer, a surfactant, a defoaming agent, a leveling agent, etc., within a range not to impair the transparency of the coating film.

The effects of the present invention can be confirmed by a photograph showing such a state that the surface of paper on which letters are printed, is covered with a transparent quartz glass sheet formed with a hardened coating film having transparency of the present invention. For example, when the right hand half of the glass sheet is coated with a silica-containing coating film (a mixed coating film) and the left hand half is in a state where the transparency-imparting treatment of the present invention is applied to such a coating film, it is observed that in the case of the silica-containing hardened coating film itself (right hand half), the letters on the paper located underneath can not be seen or can be seen only obscurely as covered by a white silica-containing coating film, while in the case where the transparency-imparting treatment of the present invention is applied (left hand half), letters can clearly be seen, as the entire silica-containing coating film is made transparent.

The detailed mechanism whereby the transparency is imparted by this overcoat layer to the basically opaque hardened coating film, is not clearly understood. However, it is considered that into pores in the hardened coating film made of the above secondary particles of foliar silica and the transparent organic polymer material, the same type or different type transparent organic polymer material constituting the above overcoat layer, is impregnated and filled, whereby the pore volume is reduced and/or fine irregularities on the coating film surface are reduced thereby to reduce scattering of light. Thus, it is considered that mainly by such two effects, the transparency is imparted, and a hardened coating film having a gloss as well, can be obtained.

Such pores in the hardened coating film are considered to have been formed since, due to the presence of the secondary particles of silica in the coating film, the portions from which the solvent has left during drying of the coating film, have not completely been shrinked, and the fine irregularities on the coating film surface are considered to have been formed, since the secondary particles of silica having a particle size of a $\mu$m order (a value measured by a Coulter counter) remain on the coating film surface.

The ratio of the solid content of the secondary particles of foliar silica to the total solid content of the secondary particles of foliar silica and the transparent organic polymer material in the hardened coating film is at most 90 mass %, preferably at most 80 mass %, more preferably at most 70 mass % and at least 1 mass %. If it exceeds 90 mass %, even if pores in the hardened coating film containing the secondary particles of foliar silica and the transparent organic polymer material, are substantially filled with the same type or the different type of a transparent polymer material, the transparency of the hardened coating film will not be sufficiently high.

Further, in order to make the mechanism of filling pores in the hardened coating film comprising the secondary particles of foliar silica and the transparent organic polymer material with the same type or different type of a transparent organic polymer material to reduce the pore volume, effective, the pore volume in the hardened coating film after forming the overcoat layer is preferably at most 0.10 ml/g, more preferably at most 0.05 ml/g. If the pore volume exceeds 0.10 ml/g, the transparency of the hardened coating film will not be sufficiently high.

Such pore volume can be obtained as follows, from V1 which is the measured value of the pore volume (total) after forming the overcoat. Namely, if the thickness of the coating film comprising the secondary particles of foliar silica and the transparent organic polymer, directly formed on the substrate surface (in this invention, this may sometimes be referred to as a "mixed coating film" or a "silica-containing coating film") is L1 and the total coating film thickness after forming the overcoat thereon is L2, the pore volume V2 of the mixed coating film itself after forming the overcoat can be calculated from V1 by the following formula (1), since the coating film of the overcoat contains no silica particles and accordingly contains no pores, and the pore volume of the overcoat can be regarded as being substantially 0:

$$V2 = V1 \times (L2/L1) \tag{1}$$

The overcoat layer may not necessary be a thick hardened coating film, and the coating film thickness of the overcoat layer may be extremely thin and may be one substantially close to a single layer coating film. Namely, it is not essential to form a thick overcoat film, and it may be a very thin coating film so long as it has a sufficient thickness to provide the above mechanism. The thickness is preferably from about 0.001 to 50 µm.

A second method is such that a hardenable composition is prepared by blending an aqueous slurry containing the secondary particles of foliar silica having the average particle size reduced to a level of less than 1 µm, to an organic polymer material in an aqueous emulsion form. In this case, the coating film made of the organic polymer material and the secondary particles of foliar silica, which is formed by coating and drying, has a characteristics such that a coating film having high transparency and gloss can be obtained without overcoating an organic polymer material in an aqueous emulsion form as required in the first method.

In order to pulverize the secondary particles of foliar silica without destroying the laminated structure, it is preferred to use the above-mentioned wet type pulverizing apparatus (disintegrating apparatus) employing a pulverizing medium such as zirconia beads having a diameter of from 0.2 to 1.0 mm. Namely, in a case where the slurry of the tertiary agglomerated particles of silica is supplied to the above disintegrating apparatus to carry out disintegrating treatment continuously, in the above-mentioned method, the secondary particles are obtained by one pass, but in this case, this treatment may be repeated. Usually, the number of repetition is preferably several times, particularly preferably at least three times. In the case of one pass i.e. no repetition, the retention time for the one pass may be extended sufficiently.

By this disintegrating method, surprisingly, the particles can be pulverized while the laminated structure is substantially maintained. It is considered that the pulverizing mechanism employed here is not a mechanism to intensely pulverize the particles by mechanical pulverization based on a strong impact force, but a mechanism to disintegrate mainly those having thick laminated structures to particles having thinner laminated structures or, irrespective of the thickness of the layer, pulverization is carried out mainly along the longitudinal direction or the direction perpendicular to the longitudinal direction of the particles, whereby the laminated structure is basically maintained. In fact, when the secondary particles of silica after pulverization are observed by SEM and/or TEM, no substantial change in the laminated structure itself is observed. Further, the film-forming property will not be impaired, as will be shown by the Examples given hereinafter.

As described above, it is possible to obtain the secondary particles of silica pulverized while maintaining the layered structure, whereby the particle size of the pulverized particles is preferably less than 1 µm and at least 0.001 µm.

By using such secondary particles of foliar silica pulverized to an average particle size of less than 1 µm, it is possible to obtain a hardened coating film having transparency imparted to have a light transmittance at a wavelength of 500 nm of at least 70%, which is considered to be attributable to the decrease of scattering of light attributable to the decrease of pore structures in the coating film and/or the decrease of fine irregularities on the coating surface, as already mentioned above.

Such a method of using the pulverized secondary particles of foliar silica (hereinafter may sometimes be referred to as a "pulverization method") may be used alone without applying the above mentioned overcoating method, or it is possible to use it in combination with the above-mentioned overcoating method. When it is used alone, the particle size is preferably less than 1 µm.

Further, in a case where the pulverization method is used alone, in the formula (1), L1=L2, and accordingly, V2=V1.

Evaluation Method for the Transparency of the Hardened Coating Film

In the present invention, evaluation of the transparency of the hardened coating film is carried out by the following method.

A quartz glass sheet (100 mm×100 mm×2 mm) is prepared, and using a bar coater coating method (JIS K5400), a hardenable composition is coated on one side of the above quartz glass sheet by means of a bar coater (e.g. one manufactured by Eto Kikai K.K.) and dried at room temperature to obtain a test piece. At that time, the coated amount (calculated as the solid content) and the thickness of the coating layer are measured.

Light transmittances at various wavelengths of this test piece are measured by a self-recording spectrophotometer (e.g. U-4000 model, manufactured by Hitachi Seisakusho K.K.).

In a case where the film thickness varies among coating films of the same formulation, when comparison is to be made as light transmittances at the same coating film thickness, calculation is made by the formula (2) based on the Beer rule which is the basic rule of spectrophotometry on the assumption that the coating films are uniform in the direction of their thicknesses:

$$\mathrm{Log}_{10}(I_0/I) = K \times L \tag{2}$$

where $I_0$: Intensity of incident light $I$: Intensity of light after transmission through the hardened coating film $L$: Thickness (µm) of the hardened coating film $K$: Constant (which will be constant in a case where the coating film thickness varies with coating films of the same formulation.)

(5) With Respect to Formation of a Hardened Coating Film and a Highly Water Resistant Coating Film The hardened coating film in the present invention as described in the foregoing is prepared basically by coating and drying on a substrate surface a hardenable composition comprising an aqueous slurry of the secondary particles of foliar silica, the functional fine particles and, if necessary, a particle binder. Preparation of such a hardenable composition is carried out by mixing an aqueous slurry of the secondary particles of foliar silica with the functional fine particles and, if desired, a particle binder and, if necessary, water, to obtain an aqueous slurry of a hardenable composition. As mentioned above, a means for mixing the aqueous slurry is not particularly limited, and an agitation apparatus having stirring vanes or a wet system disperser employing dispersing beads, may, for example be employed.

Further, in a case where as the particle binder, an organic polymer material in an aqueous emulsion form is used as mixed with an aqueous slurry of the secondary particles of foliar silica, it is advisable to be careful about the following point.

Namely, in general, with an organic polymer material in an aqueous emulsion form, the stability of the emulsion form is highly depending on the pH, and when such an aqueous emulsion is mixed with an aqueous slurry of the secondary particles of foliar silica, the pH may be changed by such mixing, whereby the aqueous emulsion form of the organic polymer material may sometimes become unstable or in an extreme case, the aqueous emulsion form may be broken, thus leading to gelation. In such a case, it is advisable to preliminarily adjust the pH so that the pH of the aqueous slurry of the secondary particles of foliar silica substantially agrees to the pH of the organic polymer material in an aqueous emulsion form and then mix the two.

Further, as a general precaution, it is advisable to take into consideration similar adjustment of the pH in order to maintain the emulsion form of the organic polymer material constantly, even when the purpose of forming the hardened coating film by mixing the organic polymer material in an aqueous emulsion state is to form a hardened coating material as a coating material or a coating agent rather than the purpose for use as a particle binder.

In the present invention, in some cases, it is preferred to have surface roughening treatment applied to the substrate surface on which the hardened coating film is to be formed. As a means for the surface roughening treatment, a means commonly employed for forming fine irregularities and/or scratch marks on a substrate surface, can be used. Although there is no particular limitation, such treatment is preferably carried out by at least one type of treatments selected from the group consisting of sand blast treatment, sand cloth treatment, chemical polishing treatment and electrolytic polishing treatment. These surface roughening means may suitably be selected depending upon the type of the substrate to be employed or the degree of the surface roughness desired.

By such roughening of the substrate surface, it is possible to form a hardened coating film having high water resistance. Specifically, it is possible to form a hardened coating film which not only satisfies the evaluation method for water resistance by JIS but also has sufficiently high water resistance even when the "abrading water resistance evaluation method" (the test method will be described hereinafter) is applied.

Namely, it is possible to improve the water resistance under abrasion, which will be a problem especially when the content of functional fine particles contained in the coating film, is as large as at least 10 mass %, particularly in the case of a film so-called an inorganic type hardenable coating film having a high heat resistance wherein the total amount of the secondary particles of foliar silica and the functional fine particles in the hardenable coating layer is high at a level of at least 60 mass %.

The water resistance under abrasion is not mere evaluation of water resistance in terms of the presence or absence of swelling or peeling when the coating film is immersed in water, but an evaluation method under much severer conditions. Namely, the coating film is left to stand as immersed in water and then, in a state wetted with water, intensely rubbed by a finger for evaluation. Namely, it is a severe evaluation method such that even when the hardened film immersed in water is rubbed with a finger, there shouldn't be even a slight swelling of the hardened coating film felt by the finger, there shouldn't be any attachment on a finger tip of a part of the functional fine particles peeled from the hardened coating film surface, or, even in an extreme case, there shouldn't be peeling of a part of the hardened coating film.

More specifically, this abrading water resistance test method is a sever test method as compared with the JIS method such that a test piece of the hardened coating film is immersed in water at room temperature for 24 hours, then the test piece is taken out from water and immediately put on a table horizontally so that the hardened coating film surface faces above, and the hardened coating film in a state wetted with water, is rubbed with index fingers of a plurality of normal adults of from 20 to 40 years old as intensely as possible for about ten times, whereby the presence or absence of a change in the hardened coating film is examined.

If the hardened coating film of the present invention is provided not only with heat resistance but also with water resistance under abrasion, it will be possible to clean the surface of the substrate by mechanically rubbing with a pad or a brush of a cleaning machine while spraying e.g. a cleaning liquid, without damaging the coating film on the substrate surface, and it is expected that its application will further be broadened.

The surface roughening treatment in order to form a hardened coating film having high water resistance, is carried out specifically so that the maximum height (Ry) in the surface roughness of the substrate will be from 1 to 100 $\mu$m, preferably from 1 to 50 $\mu$m, more preferably from 1 to 30 $\mu$m.

Here, the maximum height Ry (also represented by Rmax) in the surface roughness is determined as prescribed in JIS B0601-1994 in such a manner that from a roughness curve of the surface of the object substrate (the object surface) measured by a surface roughness meter, a predetermined length is sampled in the direction of the roughness curve, and the distance between the top line and the bottom line of this sampled portion is measured in the longitudinal magnification direction of the roughness curve and represented by $\mu$m.

Thus, for example, in the case of a metal substrate such as a stainless steel substrate or an aluminum substrate, the surface roughness treatment to form fine irregularities, such as sand blast treatment or sand cloth treatment, is applied to the surface of the substrate, and the hardenable composition prepared as described above, is coated thereon to form a coating film. In a case where a metal substrate or the like is used, it is preferred to carry out surface cleaning treatment such as degreasing treatment after the surface roughening treatment, in accordance with a prescribed method.

In the present invention, as a means for coating the hardenable composition on the substrate surface, a means which is used for coating a usual coating material, such as coating by a brush, coating by a bar coater, spray coating or electrostatic coating, may be employed as mentioned above. Of course, surface roughening treatment may be applied also to a substrate other than metal.

Such a coating film is subjected to heat treatment after coating, preferably after drying at room temperature (normal temperature) for a few hours, at a temperature of from 100 to 1,000° C., preferably from 250 to 500° C., for from 20 minutes to 10 hours, preferably from 30 minutes to 5 hours, whereby it can be made to be a hardened coating film having a sufficiently high water resistance, which is durable even in evaluation by the abrading water resistance test as described hereinafter. For such drying or heat treating method after coating, means commonly used in a usual coating step, may be employed.

Further, in a case where in the hardened coating film, the content of functional particles is as small as e.g. less than 10%, and the content of the organic polymer material is as large as at least 30%, such a coating film may be made to be a water resistant coating film satisfying the above standards simply by drying at room temperature for a long time (from about 70 to 120 hours) without heating.

The reason why a highly water resistant hardened coating film is formed by such surface roughening, is considered to be such that the secondary particles of foliar silica have a specific physical property as mentioned above, and they are solid fine particles having extremely small solubility in water as the solvent, and have a specific scaly shape, whereby such fine particles will enter the fine irregularities on the surface of the surface roughened substrate and aligned as anchored like hooks in the irregularities to provide a strong anchoring effect, whereby the strength and the water resistance of the hardened coating film will be substantially improved.

EXAMPLES

Now, the present invention will be described in further detail with reference to Examples. However, it should be understood that the present invention is by no means restricted to such specific Examples.

Example 1
Preparation of Tertiary Agglomerated Particles of Silica Using Hydrogel as the Starting Material The starting material silica hydrogel was prepared using sodium silicate as an alkali source, as follows. 2,000 ml/min of an aqueous sodium silicate solution having a $SiO_2$ concentration of 21.0 mass % with $SiO_2/Na_2O=3.0$ (molar ratio) and an aqueous sulfuric acid solution having a sulfuric acid concentration of 20.0 mass %, were introduced from separate inlets into a container equipped with a discharge outlet and instantaneously uniformly mixed. The flow rate ratio of the two liquids was adjusted so that the pH of the liquid to be discharged into air from the discharge outlet, would be from 7.5 to 8.0, and the uniformly mixed silica sol liquid was continuously discharged into air from the discharge outlet. The discharged liquid became spherical liquid droplets in air, which were gelled in air while flying in air for about one minute along a parabolic orbit. At the falling point, an aging tank containing water was placed, and the gelled particles were permitted to fall thereinto and aged.

After the aging, the pH was adjusted to 6, followed by sufficient washing with water to obtain silica hydrogel. The obtained silica hydrogel particles had a spherical particle shape and had an average particle size of 6 mm. The mass ratio of water to the $SiO_2$ mass in this silica hydrogel particles was 4.55 times, and sodium remaining in the silica hydrogel particles was 110 ppm.

The above silica hydrogel particles were roughly pulverized by means of a double roll crusher to an average particle size of 2.5 mm and used in the next step for hydrothermal treatment.

Into an autoclave (electrical heating system, equipped with anchor type stirring vanes) having a capacity of 50,000 ml, 23.7 kg of the above silica hydrogel ($SiO_2$: 18 mass %) having a particle size of 2.5 mm and 5.5 kg of an aqueous sodium silicate solution ($SiO_2$: 28.75 mass %, $Na_2O$: 9.3 mass %, $SiO_2/Na_2O=3.17$ (mol ratio)) were charged so that the total $SiO_2/Na_2O$ mol ratio in the system would be 12.0, and 10.7 kg of deionized water was added thereto, and hydrothermal treatment was carried out at 185° C. for 8 hours with stirring at a rotational speed of 50 rpm. The total silica concentration in the system was 15 mass % as $SiO_2$.

The slurry after the hydrothermal treatment was subjected to filtration and washing with water by means of a filter cloth type vertical centrifugal separator (TU-18 model, manufactured by Toko Kikai K.K.), to obtain a wet cake of silica having a water content of 69.7 mass % (solid content concentration: 30.3 mass %).

Water was added to the above wet cake, followed by repulping to obtain a slurry of silica having a $SiO_2$ concentration of 7.0 mass %. The pH of this slurry was 6.5. Then, this slurry was dried at a hot air temperature of 300° C. by means of a medium fluidized bed drier (SFD-MINI model, manufactured by Ogawara Seisakusho K.K.) to obtain 5.6 kg of a dried fine powder.

By a powder X-ray diffraction spectrum, identification of the formed phases was carried out with respect to the formed fine powder, whereby in the X-ray diffraction spectrum, in addition to the main peaks of silica-X corresponding to ASTM card number 16-0380 which is characterized by the main peaks at $2\theta=4.9°$ and $26.0°$, peaks corresponding to ASTM card numbers 31-1234 and 37-0386 were observed. Further, the ratio of the peak height at $2\theta$ of $26.0°$ to the peak height at $2\theta$ of $4.9°$, was 2.5.

Further, the oil adsorption (JIS K5101) of this fine powder was measured and found to be 110 ml/100 g.

The form of the formed particles was observed by TEM, whereby it was observed that secondary particles of foliar silica were formed by a plurality of scaly thin primary particles which are overlaid one on another and aligned face-to-face in parallel with one another.

On the other hand, the form of the formed particles was observed by SEM, whereby the above primary particles were not identified, and the above secondary particles of foliar silica were observed as if they were primary particles. It was observed that the shape of the foliar particles was scaly, and such scaly particles were overlaid one on another irregularly to form tertiary agglomerated particles of silica having numerous pore spaces (voids or pockets). This is the tertiary agglomerated particles of silica in the present invention.

As observed by SEM, the average thickness of the portion of the foliar particles (corresponding to the secondary particles by TEM) was 0.06 μm, and the average maximum length of the plates was 5.4 μm and thus the aspect ratio was 90, and the average minimum length of the plates was 1.6 μm, and thus the aspect ratio was 27.

The average particle size of this fine powder (the tertiary agglomerated particles of silica) was measured by means of a Coulter counter (MAII model, manufactured by Coulter Electronics Company, apertures tube diameter: 50 μm (the same applies in the following Examples 1 to 9)), whereby it was found to be 6.1 μm.

Further, the amount of crystalline free silicic acid in this fine powder was measured by an X-ray diffraction analysis, whereby it was found to be below the detectable limit (less than 2%).

Example 2
Preparation of Tertiary Agglomerated Particles of Silica Using Hydrogel as the Starting Material The starting material silica hydrogel was prepared using NaOH as an alkali source, as follows. 2,000 ml/min of an aqueous sodium silicate solution having a $SiO_2$ concentration of 21.0 mass % with $SiO_2/Na_2O=3.0$ (mol ratio) and an aqueous sulfuric acid solution having a sulfuric acid concentration of 20.0 mass %, were introduced from separate inlets into a container provided with a discharge outlet and instantaneously uniformly mixed. The flow rate ratio of the two liquid was adjusted so that the pH of the liquid discharged into air from the discharge outlet would be 7.5 to 8.0, and the uniformly mixed silica sol liquid was continuously discharged into air from the discharge outlet. The discharged liquid became spherical liquid droplets in air, which were gelled in air while flying in air for about one second along a parabolic orbit. At a falling point, an aging tank containing water was placed, and the gelled particles were permitted to fall thereinto and aged.

After the aging, the pH was adjusted to 6, followed by sufficient washing with water to obtain silica hydrogel. The obtained silica hydrogel particles had a spherical particle shape and had an average particle size of 6 mm. The mass ratio of water to the $SiO_2$ mass in the silica hydrogel particles was 4.38 times, and sodium remaining in the silica hydrogel particles was 112 ppm.

The above silica gel hydrogel particles were roughly pulverized to an average particle size of 2.5 mm and used in the next step for hydrothermal treatment.

Into an autoclave (electrical heating system, equipped with anchor type stirring vanes) having a capacity of 5,000 ml, 2,688 g of the above silica hydrogel ($SiO_2$: 18.6 mass %) having a particle size of 2.5 mm and 126 g of an aqueous sodium hydroxide solution (NaOH: 48.5 mass %) were charged so that the total $SiO_2/Na_2O$ mol ratio in the system would be 11.0, then, 1,186 g of deionized water was added thereto, 0.5 g of seed crystals were added, and hydrothermal treatment was carried out at 180° C. for 12 hours with stirring at a rotational speed of 20 rpm. The total silica concentration in the system was 12.5 mass % as $SiO_2$.

The slurry after the hydrothermal treatment was subjected to filtration and washing with water by means of a filter cloth type vertical centrifugal separator (TU-18 model, manufactured by Toko Kikai K.K.), to obtain a wet cake of silica having a water content of 66.7 mass % (solid content concentration: 33.3 mass %).

Then, water was added to the above wet cake, followed by repulping to obtain a slurry of silica having a $SiO_2$ concentration of 7.0 mass %. The pH of this slurry was 6.6. Then, this slurry was dried at a hot air temperature of 300° C. by means of a medium fluidized bed drier (SFD-MINI model, manufactured by Ogawara Seisakusho K.K.) to obtain 408 g of a dried fine powder.

With respect to the formed fine powder, by a powder X-ray diffraction spectrum, identification of formed phases was carried out, whereby in addition to the main peaks of silica-Y characterized by the main peaks 2θ=5.6°, 25.8° and 28.3° corresponding to ASTM card number 31-1233, peaks corresponding to ASTM card numbers 35-63 and 25-1332, were observed. Further, the oil adsorption (JIS K5101) of this fine powder was measured and found to be 100 ml/100 g.

The form of the formed particles was observed by TEM, whereby it was observed that secondary particles of foliar silica were formed by a plurality of scaly thin primary particles which are overlaid one on another and aligned face-to-face in parallel with one another.

On the other hand, the form of the formed particles was observed by SEM, whereby the above primary particles were not identified, and the above secondary particles of foliar silica were observed as if they were primary particles. It was observed that the shape of the foliar particles was scaly, and such scaly particles were overlaid irregularly to form tertiary agglomerated particles of silica in the present invention having numerous pore spaces (voids or pockets).

As observed by this SEM, the average thickness of the foliar silica particles (corresponding to the secondary particles by TEM) was 0.07 μm, while the average maximum length of the plates was 6.0 μm, and thus, the aspect ratio was 86, and the average minimum length of the plates was 1.8 μm, and thus, the aspect ratio was 26.

Further, the average particle size of this fine powder was measured by means of a Coulter counter (MAII model, manufactured by Coulter Electronics Company), and was found to be 6.5 μm.

Further, the amount of crystalline free silicic acid in this fine powder was measured by an X-ray diffraction analysis, and found to be less than the detectable limit (less than 2%).

Example 3
Preparation of Tertiary Agglomerated Particles of Silica Using Silica Sol as the Starting Material 5,400 g of an aqueous sodium silicate solution containing 2.42 mass % of $Na_2O$ and 7.36 mass % of $SiO_2$ ($SiO_2/Na_2O=3.13$ (molar ratio)) was prepared, and removal of sodium was carried out by means of electrodialyzer (DS-O model, manufactured by Asahi Glass Company, Limited) until $Na_2O$ became 1.35 mass % and $SiO_2$ became 9.16 mass % ($SiO_2/Na_2O=7.0$ (molar ratio)) to obtain silica sol (active silicic acid).

The average particle size of the colloidal silica of the obtained silica sol was at most 3 nm as measured by a laser scattering particle size measuring apparatus manufactured by Otsuka Denshi K.K.

Then, into an autoclave (electrical heating system, equipped with anchor type stirring vanes) having a capacity of 5,000 ml, as a hydrothermal treating apparatus, 2,183 g of the above silicic acid and 1,817 g of deionized water were charged, and 0.5 g of seed crystals were added, whereupon hydrothermal treatment was carried out at 200° C. for 8.5 hours with stirring at a rotational speed of 200 rpm.

The slurry after the hydrothermal treatment was subjected to filtration and washing with water by means of a filter cloth type vertical centrifugal separator (TU-18 model, manufactured by Toko Kikai K.K.), to obtain a wet cake of silica having a water content of 68.7 mass % (solid content concentration: 31.3 mass %).

Then, water was added to the above wet cake, followed by repulping to obtain a slurry of silica having a $SiO_2$ concentration of 7.0 mass %. The pH of this slurry was 6.6. Then, using a medium fluidized bed drier (SFD-MINI model, manufactured by Ogawara Seisakusho K.K.), the slurry was dried at a hot air temperature of 300° C. to obtain 151 g of a dried fine powder.

With respect to the formed fine powder, by a powder X-ray diffraction spectrum, identification of formed phases was carried out, whereby as the X-ray diffraction spectrum, it was found to be a single phase showing the main peaks of silica-X characterized by the main peaks at 2θ=4.9° and 26.0° corresponding to ASTM card number 16-0380. Further, the oil adsorption (JIS K5101) of this fine powder was measured and found to be 105 ml/100 g.

The form of the formed particles was observed by TEM, whereby it was observed that secondary particles of foliar silica were formed by a plurality of scaly thin primary particles which are overlaid one on another and aligned face-to-face in parallel with one another.

On the other hand, the form of the formed particles were observed by SEM, whereby the above primary particles were not identified, and the above secondary particles of foliar silica were observed as if they were primary particles. It was observed that the shape of the foliar particles was scaly, and such scaly particles were overlaid one on another irregularly to form tertiary agglomerated particles of silica in the present invention having numerous pore spaces (voids or pockets).

As observed by this SEM, the average thickness of the foliar silica particles (corresponding to the secondary particles by TEM) was 0.05 µm, while the average maximum length of the plates was 3 µm, and thus, the aspect ratio was 60, and the average minimum length of the plates was 1.2 µm, and thus, the aspect ratio was 24.

Further, the average particle size of this fine powder was measured by means of a Coulter counter (MAII model, manufactured by Coulter Electronics Company), and was found to be 5.1 µm.

Further, the amount of crystalline free silicic acid in the fine powder was measured by an X-ray diffraction analysis, and was found to be less than the detectable limit (less than 2%)

Example 4

Preparation of the Secondary Particles of Foliar Silica of the Present Invention in a Slurry Form from the Wet Cake of Example 1

1,020 g of water was added to 1,000 g of the wet cake (solid content concentration: 30.3 mass %) after filtration and washing with water by the centrifugal separator shown in Example 1, followed by repulping to obtain a silica slurry having a solid content of 15 mass %. In this slurry form, the average particle size by a Coulter counter was 7.2 µm, and the viscosity by a B-type viscometer was 0.010 Pa·s.

Then, this slurry was passed once through a medium stirring beads mill (Dyno mill KDL-PILOT A model, manufactured by Shinmaru Enterprises Co. (vessel capacity: 1.4 l filled 80% with zirconia beads having a diameter of 0.5 mm)) at a shaft rotational speed of 3,400 rpm at a flow rate of 30 l/hr to carry out disintegration and dispersion of the tertiary agglomerated particles of silica thereby to obtain an aqueous slurry of secondary particles of foliar silica having a solid content concentration of 15 mass %. The pH of this slurry was 6.5.

The average particle size by a Coulter counter of the fine particles in the slurry after disintegration and dispersion, was 1.6 µm. Further, the viscosity of this slurry was measured by a B-type viscometer and was found to be 0.13 Pa·s.

Further, after evaporating the water content of the slurry to dryness, silica and sodium in the dried solid were analyzed, and whereby the amount of sodium was 730 ppm based on the $SiO_2$ unit mass.

Then, in order to examine the physical properties of the secondary particles of foliar silica dried close to the state of fine particles, of the fine particles in the slurry, a dried powder was obtained by the following method.

Such a slurry has a specific nature such that it is very likely to be agglomerated by drying, and therefore, in order to obtain a monodispersed dry powder, it is necessary to make an aqueous slurry having an extremely low concentration and to dry it while preventing agglomeration.

Water was added to the slurry (solid content concentration: 15 mass %) to adjust the slurry concentration to a solid content concentration of 0.3 mass %.

This slurry was spray-dried by means of a small size spray drier (GA32 model, manufactured by Yamato Kagaku K.K.) with a slurry supplying rate of 1.7 ml/min under a spray pressure of 0.3 MPa (G) at a hot air temperature of 130° C., to obtain a dried fine powder.

The average particle size by a Coulter counter of the obtained dried fine powder was 1.9 µm.

This fine powder was observed by SEM, whereby tertiary agglomerated particles of silica were not substantially observed, and this fine powder was found to consist essentially of the secondary particles of foliar silica of the present invention.

With respect to this fine powder, by a powder X-ray diffraction spectrum, identification of formed phases was carried out, whereby in addition of the main peaks of silica-X characterized by the main peaks at 2θ=4.9° and 26.0° corresponding to ASTM card number 16-0380, peaks corresponding to ASTM card numbers 31-1234 and 37-0386 were observed.

Further, the ratio of the peak height at 2θ of 26.0° to the peak height at 2θ of 4.9°, was 1.4.

The form of the formed particles was observed by TEM, whereby it was observed that the secondary particles of foliar silica of the present invention were formed by a plurality of scaly thin primary particles which were overlaid one on another and aligned face-to-face in parallel with one another.

Further, this fine powder was embedded in an epoxy resin, and an ultra thin cut specimen was prepared by an ultra microtome and observed by TEM, whereby the thickness of primary particles was found to be extremely thin at a level of from 1 to 10 nm.

As measured by a BET pore distribution measuring apparatus (BELSORP-28 model, manufactured by Nippon Bell Co.), the pore volume of the fine powder was 0.12 ml/g, the specific surface area was 65 m$^2$/g, and in the pore distribution curve, a sharp large peak of a mesopore region was observed in the vicinity of 3.6 nm.

Further, in the measurement of the infrared adsorption spectrum (FT-IR510 model, manufactured by Nikorey Japan K.K.) of the fine powder, silanol groups having an adsorption band at each of from 3,600 to 3,700 cm$^{-1}$ and from 3,400 to 3,500 cm$^{-1}$, were observed.

Further, the amount of silanol groups (SiOH) was obtained from the calculation formula of silanol groups (SiOH) per silica unit mass=W×1111.1 (µmol/g) from the difference (W mass %) between the weight reduction by drying at 120° C. for two hours and the weight reduction by heating at 1,200° C. for 3 hours, and found to be 3,650 µmol/g, and it showed a large value of 56.2 µmol/m$^2$ per specific surface area by the BET method.

With respect to the heat resistance, no particular change was observed at a temperature of from 500 to 1,000° C. in an air atmosphere, by the observation by SEM.

With respect to the saturated solubility at 20° C. in an aqueous acid solution and an aqueous alkali solution, the dissolved $SiO_2$ concentration was 0.008 mass % in a 10 mass % HCl aqueous solution, 0.006 mass % in deionized water, 0.55 mass % in a 5% NaOH aqueous solution, and 0.79 mass % in a 10 mass % NaOH aqueous solution. Especially with respect to alkali resistance, for example, as compared with silica gel, it showed a very low solubility (in the case of silica gel, the solubility is 6.5 mass % even in 3 mass % NaOH aqueous solution).

Example 5

Preparation of the Secondary Particles of Foliar Silica of the Present Invention in a Slurry Form from the Wet Cake of Example 1

1,164 g of water was added to 1,000 g of the wet cake (solid content concentration: 30.3 mass %) after filtration and washing with water by the centrifugal separator shown in Example 1, followed by repulping to obtain a silica slurry having a solid content of 14 mass %. In this slurry state, the average particle size by a Coulter counter was 7.2 μm.

Then, this slurry was passed three times through a medium stirring beads mill (Dyno mill KDL-PILOT A model, manufactured by Shinmaru Enterprises Company (vessel capacity: 1.4 l, filled 80% with zirconia beads having a diameter of 0.5 mm)) at a shaft rotational speed of 3,400 rpm at a flow rate of 10 l/hr, to carry out disintegration and dispersion of the tertiary agglomerated particles of silica thereby to obtain an aqueous slurry of secondary particles of foliar silica having a solid content concentration of 14 mass %. The pH of this slurry was 6.4. The viscosity was measured by a B-type viscometer and was found to be 0.5 Pa·s.

The average particle size of the fine particles in the slurry after disintegration and dispersion was 0.54 μm as measured by a laser/diffraction scattering type particle size distribution measuring apparatus.

Further, after evaporating the water content of the slurry to dryness, silica and sodium in the dried solid were analyzed, whereby the amount of sodium was 740 ppm based on the $SiO_2$ unit mass.

Example 6
Preparation of the Secondary Particles of Foliar Silica in an Aqueous Slurry Form from the Wet Cake of Example 1

1,164 g of water was added to 1,000 g of the wet cake (solid content concentration: 30.3 mass %) after filtration and washing with water by the centrifugal separator shown in Example 1, followed by repulping to obtain a silica slurry having a solid content of 14 mass %. In this slurry state, the average particle size by a Coulter counter was 7.2 μm.

Then, a very small amount of an aqueous sodium hydroxide solution was added to obtain an aqueous slurry of tertiary agglomerated particles having the pH adjusted to 8.4 and the solid content concentration adjusted to 14 mass %, and this water slurry was passed three times through a medium stirring beads mill (Dyno mill KDL-PILOT A model, manufactured by Shinmaru Enterprises Co. (vessel capacity: 1.4 l, filled 70% with zirconia beads having a diameter of 0.5 mm)) at a shaft rotational speed of 3,400 rpm at a flow rate of 10 l/hr, to carry out disintegration and dispersion of the tertiary agglomerated particles of silica thereby to obtain an aqueous slurry of secondary particles of foliar silica having a solid content concentration of 14 mass %.

The average particle size of the fine particles in the slurry after disintegration and dispersion was 0.56 μm as measured by a laser diffraction/scattering type particle size distribution measuring apparatus (LA-920 model, manufactured by Horiba Seisakusho). The viscosity was measured by a B-type viscometer and was found to be 0.15 Pa·s.

Further, after evaporating the water content in the slurry to dryness, silica and sodium in the dried solid were analyzed, whereby the amount of sodium was 13,480 ppm based on the $SiO_2$ unit mass.

Example 7
Preparation of the Secondary Particles of Foliar Silica of the Present Invention in a Slurry Form from the Dried Powder of Example 1

300 g of the dried fine powder obtained by the medium fluidized bed drier in Example 1 was added to 1,700 g of water to obtain a slurry having a solid content of 15 mass % (average particle size: 6.1 μm, viscosity: 0.008 Pa·s).

Then, this slurry was passed once through a medium stirring beads mill (Dyno mill KDL-PILOT A model, manufactured by Shinmaru Enterprises Co. (vessel capacity: 1.4 l, filled 80% with zirconia beads having a diameter of 0.5 mm)) at a shaft rotational speed of 3,400 rpm at a flow rate of 30 l/hr, to carry out disintegration and dispersion of tertiary agglomerated particles of silica.

The average particle size by a Coulter counter of the fine particles in the slurry after the disintegration and dispersion, was 1.6 μm. Further, the viscosity of this slurry was measured by a B-type viscometer and was found to be 0.029 Pa·s.

The fine particles in the slurry were observed by SEM, whereby tertiary agglomerated particles of silica were not substantially observed, and it was found that they consisted substantially of the secondary particles of foliar silica of the present invention.

Example 8
Preparation of the Secondary Particles of Foliar Silica of the Present Invention in a Slurry Form from the Wet Cake of Example 3

1,087 g of water was added to 1,000 g of the wet cake (solid content concentration: 31.3 mass %) after the filtration and washing with water by the centrifugal separator shown in Example 3, followed by repulping to obtain a silica slurry having a solid content of 15 mass %.

In this slurry state, the average particle size by a Coulter counter was 6.1 μm, and the viscosity by a B-type viscometer was 0.010 Pa·s.

Then, this slurry was passed once through a medium stirring beads mill (Dyno mill KDL-PILOT A model, manufactured by Shinmaru Enterprises Co. (vessel capacity: 1.4 l, filled 80% with zirconia beads having a diameter of 0.5 mm)) at a shaft rotational speed of 3,400 rpm at a flow rate of 30 l/hr, to carry out disintegration and dispersion of tertiary agglomerated particles of silica.

The average particle size by a Coulter counter of the fine particles in the slurry after the disintegration and dispersion, was 1.7 μm. Further, the viscosity of this slurry was measured by a B-type viscometer and was found to be 0.15 Pa·s.

The fine particles in the slurry were observed by SEM, whereby tertiary agglomerated particles of silica were not substantially observed, and it was found that they consisted substantially of the secondary particles of foliar silica of the present invention.

Example 9
Preparation of the Secondary Particles of Foliar Silica of the Present Invention in a Slurry Form from the Wet Cake of Example 2

1,220 g of water was added to 1,000 g of the wet cake (solid content concentration: 33.3 mass %) after the filtration and washing with water by the centrifugal separator shown in Example 2, followed by repulping to obtain a silica slurry having a solid content of 15 mass %.

In this slurry state, the average particle size by a Coulter counter was 6.8 μm, and the viscosity by a B-type viscometer was 0.010 Pa·s.

Then, this slurry was passed once through a medium stirring beads mill (Dyno mill KDL-PILOT A model, manufactured by Shinmaru Enterprises Co. (vessel capacity: 1.4 l, filled 80% with zirconia beads having a diameter of 0.5 mm)) at a shaft rotational speed of 3,400 rpm at a flow rate of 30 l/hr, to carry out disintegration and dispersion of tertiary agglomerated particles of silica.

The average particle size by a Coulter counter of the fine particles in the slurry after the disintegration and dispersion, was 1.6 μm. Further, the viscosity of this slurry was measured by a B-type viscometer and was found to be 0.16 Pa·s.

The fine particles in this slurry were observed by SEM, whereby tertiary agglomerated particles of silica were not substantially observed, and it was found that they consisted substantially of the secondary particles of foliar silica of the present invention.

Example 10

Coating Film Obtained from a Hardenable Composition for Coating Material or Agent Comprising the Silica Slurry of Example 4

50 g of the slurry (solid content concentration: 15 mass %, average particle size: 1.6 μm) after the treatment by the medium stirring beads mill in Example 4, was put into a beaker, and sufficiently stirred and mixed by a stirrer.

Then, a glass sheet (soda-lime glass, 70 mm×150 mm×2 mm thick) in accordance with JIS K5400, was prepared, and the slurry was coated on the glass sheet by means of a bar coater coating method (JIS K5400) by means of #100 bar coater (manufactured by Eto Kikai K.K.) and dried at room temperature to obtain a test piece. The coated amount was 20 g/m² as calculated as the solid content. The outer appearance of the coating film was smooth, and no cracking or the like was observed.

Further, SEM of the cross section of the coating film is shown in FIG. 4. From the photograph, it is observed that the secondary particles of foliar silica respectively have certain curvatures, and engaged one another in the curved states and densely overlaid one on another. Further, by means of a laser, the coating film was peeled, and the pore structure thereof was measured by means of a BET pore distribution measuring apparatus (BELSORP-28 model, manufactured by Nippon Bell Co.), whereby the pore volume was 0.13 ml/g, the specific surface area was 66 m²/g, and in the pore distribution curve, a sharp large peak of a mesopore region was observed in the vicinity of 3.6 nm. This is a numerical value close to the pore structure of the secondary particles of foliar silica shown in Example 4, and it is considered that in the coating film formed as described above, the secondary particles of folia silica are densely overlaid one on another. Further, it is shown that as described above, this coating film has air permeability since it has a porous structure.

Further, the X-ray diffraction measurement of the surface of the coating film peeled by means of a razor was carried out, whereby it was found that the ratio of the two main peaks corresponding to ASTM card number 16-0380 of silica-X i.e. the ratio of the peak height at 2θ of 26.0° to the peak height at 2θ of 4.9°, was as small as 0.07, thus indicating that the crystal particles forming the coating film were aligned.

For evaluation of the coating film, in accordance with JIS K5400, the pencil hardness, the cross cut test and the water resistance (24 hours in water at room temperature) were measured, and the results are shown in Table 1.

TABLE 1

|  | Coated amount (g/m²) | Pencil hardness test | Cross cut test | Water resistance test |
| --- | --- | --- | --- | --- |
| Ex. 10 | 20 | 4H | 10 points | No change |
| Ex. 11 | 100 | 4H | 10 points | No change |
| Ex. 12 | 20 | 9H | 10 points | No change |
| Ex. 13 | 20 | F | 10 points | No change |
| Ex. 14 | 20 | 4H | 10 points | No change |
| Ex. 15 | 20 | H | 10 points | No change |

TABLE 1-continued

|  | Coated amount (g/m²) | Pencil hardness test | Cross cut test | Water resistance test |
| --- | --- | --- | --- | --- |
| Ex. 16 | 20 | H | 10 points | No change |
| Ex. 19 | 20 | 4H | 10 points | No change |

Example 11

Coating Film Obtained from a Hardenable Composition (In a Case of Thick Coating) for a Coating Material or Agent Comprising the Silica Slurry of Example 4

50 g of the slurry (solid content concentration: 15 mass %, average particle size: 1.6 μm) after the treatment by the medium stirring beads mill in Example 4, was put into a beaker, and sufficiently stirred and mixed by a stirrer.

Then, a glass plate (soda-lime glass, 70 mm×150 mm×2 mm thick) in accordance with JIS K5400, was prepared, and the slurry was coated four times on the glass sheet by a bar coater coating method (JIS K5400) by means of the #120 bar coater (manufactured by Eto Kikai K.K.) and dried at room temperature to obtain a test piece. The coated amount was 100 g/m² as calculated as the solid content.

For evaluation of the coating film, in accordance with JIS K5400, the pencil hardness, the cross cut test and the water resistance (24 hours in water at room temperature) were measured, and the results are shown in Table 1.

Example 12

Coating Film Obtained from a Hardenable Composition (an Example Showing its Heat Resistance) for a Coating Material or Agent Comprising the Silica Slurry of Example 4

50 g of the slurry (solid content concentration: 15 mass %, average particle size: 1.6 μm) after the treatment by the medium stirring beads mill in Example 4, was put into a beaker, and sufficiently stirred and mixed by a stirrer.

Then, a quartz glass sheet (100 mm×100 mm×2 mm thick) was prepared, and the slurry was coated on the quartz glass sheet by a bar coater coating method (JIS K5400) by means of a #100 bar coater (manufactured by Eto Kikai K.K.), and dried at room temperature, and then further fired at 600° C. for one hour to obtain a test piece. The coated amount was 20 g/m² as calculated as the solid content.

For evaluation of the coating film, in accordance with JIS K5400, the pencil hardness, the cross cut test and the water resistance (24 hours in water at room temperature) were measured, and the results are shown in Table 1. From the Table, this coating film was found to have substantial heat resistance.

Example 13

Coating Film Obtainable from a Hardenable Composition for a Coating Material or Agent Obtained by Incorporating an Epoxy Type Aqueous Resin Emulsion to the Silica Slurry of Example 4

Into a 250 ml plastic bottle, 9.68 g of Adeka resin EM0460 (an aqueous emulsion of an epoxy type resin, manufactured by Asahi Denka Kogyo K.K., solid content concentration: 40 mass %) and 38.70 g of deionized water were charged and mixed by shaking the plastic bottle.

Then, 145.40 g of the slurry (solid content concentration:15 mass %) after the treatment by the medium stirring beads mill in Example 4 was added, and the 250 ml plastic bottle was shaked by a shaking machine (V-5 model, manufactured by Iwaki K.K.) until the entirety became uniform, followed by deairation under reduced pressure by an aspirator, since foaming was slightly observed, to obtain a hardenable composition.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #120 bar coater (manufactured by Eto Kikai K.K.) and dried at room temperature to obtain a test piece. The coated amount was 20 g/m$^2$ as calculated as the solid content. The outer appearance of the coating film was smooth, and no cracking or the like was observed.

Here, the mass ratio of the secondary particles of foliar silica of Example 4 to the solid content of the resin emulsion was 85:15.

For evaluation of the coating film, in accordance with JIS K5400, the pencil hardness, the cross cut test and the water resistance (24 hours in water at room temperature) were measured, and the results are shown in Table 1.

Example 14

Coating Film Obtainable from a Hardenable Composition for a Coating Material or Agent Having an Acrylic Urethane Type Commercially Available Coating Material Incorporated to the Silica Slurry of Example 4

Into a 250 ml plastic bottle, 5.92 g of aqueous urethane W#100 (an aqueous emulsion of an acrylic urethane type resin, manufactured by Asahi Glass Coat and Resin Company, solid content concentration: 51 mass %) and 15.60 g of deionized water were introduced and mixed by shaking the plastic bottle.

Then, sodium hydroxide was added to the slurry (solid content concentration: 15 mass %) after the treatment by the medium stirring beads mill in Example 4 to adjust the pH to 9.4, 113.3 g of such a slurry was added to the above plastic bottle, and the 250 ml plastic bottle was shaken by a shaking machine (V-5 model, manufactured by Iwaki K.K.) until the entirety became uniform, followed by deairation under reduced pressure by an aspirator as foaming was slightly observed, to obtain a hardenable composition.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #120 bar coater (manufactured by Eto Kikai K.K.), and dried at room temperature to obtain a test piece. The coated amount was 20 g/m$^2$ as calculated as the solid content. The appearance of the coating film was smooth, and no cracking or the like was observed.

Here, the mass ratio in the solid content of the secondary particles of foliar silica of Example 4 to the resin emulsion was 85:15.

Evaluation of the coating film was carried out with respect to the pencil hardness in accordance with JIS K5400, the cross cut test and the water resistance (24 hours in water at room temperature), and the results are shown in Table 1.

Example 15

Coating Film Obtainable from a Hardenable Composition for a Coating Material or Agent Having a Fluorine Resin Type Commercial Coating Material Incorporated to the Silica Slurry of Example 4

Into a 250 ml plastic bottle, 250 g of the silica slurry (solid content concentration: 15 mass %) after the treatment by the medium stirring beads mill in Example 4 was charged, and 1.25 g of a surfactant Ionet S-20 (manufactured by Sanyo Kasei Kogyo K.K.) was added thereto, and the plastic bottle was shaken by a shaking machine (V-5 model, manufactured by Iwaki K.K.) to obtain a silica slurry containing the surfactant. From this silica slurry, 113.3 g was taken and used for the following tests.

Into the above-mentioned 250 ml plastic bottle, 5.92 g of Bonflone W#1500 (an aqueous emulsion of a fluorine resin type resin manufactured by Asahi Glass Coat and Resin Company, solid content concentration: 51 mass %) and 38.70 g of deionized water were introduced.

Then, 113.3 g of the above-mentioned silica slurry containing the surfactant and 0.015 g of Silicon KS-508 (manufactured by Shinetsu Chemical Industries Co., Ltd.) were added thereto, and the 250 ml plastic bottle was shaken by a shaking machine (V-5 model, manufactured by Iwaki K.K.) until the entirety became uniform, to obtain a hardenable composition.

Further, the mass ratio in the solid content of the silica of the Example 4 to the resin emulsion was 85:15.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #100 bar coater (manufactured by Eto Kikai K.K.), and dried at room temperature to obtain a test piece. The coated amount was 20 g/m$^2$ as calculated as the solid content. The appearance of the coating film was smooth, and no cracking or the like was observed.

For evaluation of the coating film, according to JIS K5400, the pencil hardness, the cross cut test and the water resistance (24 hours in water at room temperature) were measured, and the results are shown in Table 1.

Example 16

Coating Film Obtainable from a Hardenable Composition for a Coating Material or Agent Having a Silicon Resin Type Commercial Coating Material Incorporated to the Silica Slurry of Example 4

250 g of the silica slurry (solid content concentration: 15 mass %) after the treatment by the medium stirring beads mill in Example 4 was introduced into a 250 ml plastic bottle, and 1.25 g of a surfactant Ionet S-20 (manufactured by Sanyo Kasei Kogyo K.K.) was added. The plastic bottle was shaken by a shaking machine (V-5 model, manufactured by Iwaki K.K.) for mixing to obtain a silica slurry containing the surfactant. From the silica slurry, 113.3 g was sampled and used for the following tests.

Into the above 250 ml plastic bottle, 5.59 g of Odefresh Is-100 (aqueous emulsion of a silicon resin type resin, manufactured by Nippon Paint K.K., solid content concentration: 54 mass %) and 40.0 g of deionized water were introduced.

Then, 113.3 g of the above-mentioned slurry containing the surfactant and 0.013 g of Silicon KS-508 (manufactured by Shinetsu Chemical Industries Co., Ltd) were added thereto, and then the 250 ml plastic bottle was shaken for mixing by a shaking machine (V-5 model, manufactured by Iwaki K.K.) until the entirety became uniform, to obtain a hardenable composition.

The mass ratio in the solid content of the silica of the Example 4 and the resin emulsion was 85:15.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #100 bar coater (manufactured by Eto Kikai K.K.), and dried at room temperature to obtain a test piece. The coated amount was 20 g/m$^2$ as calculated as the solid content. The appearance of the coating film was smooth, and no cracking or the like was observed.

For evaluation of the coating film, in accordance with JIS K5400, the pencil hardness, the cross cut test and the water resistance (24 hours in water at room temperature) were measured, and the results are shown in Table 1.

Example 17
Coating Film Obtainable from a Hardenable Composition for a Coating Material or Agent Having an Aqueous Emulsion of an Ethylene Tetrafluoride Resin (Hereinafter Referred to as PTFE) Incorporated to the Silica Slurry of Example 4

Into a 250 ml plastic bottle, 1.8 g of the aqueous emulsion of PTFE (Fluone AD1, tradename, manufactured by Asahi Glass Company, Limited, solid content concentration: 55 mass %) was introduced, and 60 g of the silica slurry (solid content concentration: 15 mass %) after the treatment by the medium stirring beads mill in Example 4, was added to the above plastic bottle. The 250 ml plastic bottle was shaked by a shaking machine (V-5 model, manufactured by Iwaki K.K.) until the entirety became uniform. Then, the slurry was put into a tumbler shaker mixer (T2C model, manufactured by Shinmaru Enterprises Co.), followed by mixing and dispersing for 30 minutes.

The mass ratio in the solid content of the silica of Example 4 to PTFE was 90:10.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #100 bar coater (manufactured by Eto Kikai K.K.), then dried at room temperature and further heat-treated at 380° C. for two hours, to obtain a test piece. The coated amount was 20 g/m$^2$ as calculated as the solid content. The appearance of the coating film was smooth, and no cracking or the like was observed.

For evaluation of the coating film, in accordance with JIS K5400, the pencil hardness, the cross cut test, the acid resistance (24 hours in 5% sulfuric acid at room temperature), the alkali resistance (24 hours in a 5% sodium carbonate aqueous solution at room temperature) and the water resistance (24 hours in water at room temperature) were measured, and the results are shown in Table 2.

Example 18
Coating Film Obtainable from a Hardenable Composition for a Coating Material or Agent Having a Fluorine Resin Coating Material (Using a Non-Aqueous Solvent) Incorporated to a Dried Powder of the Secondary Particles of Foliar Silica of Example 4

Into a 250 ml plastic bottle, 25 g of a fluorine resin coating material (Lumiflon LF-200, tradename, manufactured by Asahi Glass Company, Limited, solid content concentration: 60 mass %), 2.5 g of a hardening agent (Duranate TPA-100, manufactured by Asahi Kasei K.K.) and 25 g of xylene were introduced.

Then, 15 g of the fine powder of the secondary particles of foliar silica obtained in Example 4, was added to the above plastic bottle. The 250 ml plastic bottle was shaked by a shaking machine (V-5 model, manufactured by Iwaki K.K.) until the entirety became uniform, and then, the slurry was put into a tumbler shaker mixer (T2C model, manufactured by Shinmaru Enterprises Co.) and mixed and dispersed for 30 minutes.

The mass ratio in the solid content of the secondary particles of foliar silica of Example 4 to the fluorine resin coating material was 46:54.

Then, an iron plate (70 mm×150 mm×2 mm thick) in accordance with JIS K5400, was prepared, and the slurry was coated on the iron plate by a bar coater coating method (JIS K5400) by means of a #100 bar coater (manufactured by Eto Kikai K.K.), and dried at room temperature to obtain a test piece. The coated amount was 20 g/m$^2$ as calculated as the solid content.

Evaluation of the coating film was carried out with respect to the pencil hardness in accordance with JIS K5400, the cross cut test, the acid resistance (24 hours in 5% sulfuric acid at room temperature), the alkali resistance (24 hours in a 5% sodium carbonate aqueous solution at room temperature) and the water resistance (24 hours in water at room temperature) and the results are shown in Table 2.

TABLE 2

| | Coated amount g/m$^2$ | Pencil hardness test | Cross cut test | Water resistance test | Acid resistance test | Alkali resistance test |
|---|---|---|---|---|---|---|
| Ex. 17 | 20 | 4H | 8 points | No change | No change | No change |
| Ex. 18 | 20 | B | 10 points | No change | No change | No change |

Example 19
Coating Film Obtainable from a Hardenable Composition having Silica Sol Incorporated to the Silica Slurry of Example 4

45.34 g of the silica slurry (solid content concentration: 15 mass %) after the treatment by the medium stirring beads mill in Example 4 was put into a 50 ml glass bottle. Then, 4.0 g of colloidal silica (Kataroid IS-30, tradename, manufactured by Shokubai Kasei Kogyo K.K.) was added. The bottle was shaked for uniform mixing to obtain a hardenable composition.

Then, a glass sheet (soda-lime glass, 70 mm×150 mm×2 mm thick) in accordance with JIS K5400, was prepared, and the slurry was coated on the glass sheet by a bar coater coating method (JIS K5400) by means of a #100 bar coater (manufactured by Eto Kikai K.K.), and dried at room temperature to obtain a test piece. The coated amount was 20 g/m$^2$ as calculated as the solid content. The appearance of the coating film was smooth, and no cracking or the like was observed.

The mass ratio in the solid content of the secondary particles of foliar silica of Example 4 to the colloidal silica was 85:15.

Evaluation of the coating film was carried out in accordance with JIS K5400, whereby the pencil hardness was 4H, the cross cut test was 10 points, and the water resistance was "no change observed".

Example 20
Hydroscopic Coating Film Obtainable From a Hardenable Composition Having a Silica Gel Powder Incorporated to the Silica Slurry of Example 4

40 g of the silica slurry (solid content concentration: 15 mass %) after the treatment by the medium starting beads mill in Example 4 and 66 g of deionized water were put into a 200 ml plastic container and mixed, and then, 54 g of fine powder gel of A-type silica gel (manufactured by Dohkai Chemical Industry Co., LTD., average particle size: 4 μm) was added, followed by shaking and mixing for 10 minutes by a shaking machine (V-5 model, manufactured by Iwaki K.K.) to obtain a hardenable composition.

Then, a glass sheet (soda-lime glass, 100 mm×200 mm×2 mm thick) in accordance with JIS K5400, was prepared, and the slurry was coated on the glass sheet by a bar coater coating method (JIS K5400) by means of a #100 bar coater (manufactured by Eto Kikai K.K.), then dried at room temperature and further dried at 110° C. for one hour to obtain a test piece. The coated amount was 100 g/m$^2$ as calculated as the solid content. The appearance of the coating film was smooth, and no cracking or the like was observed.

The mass ratio in the solid content of the secondary particles of foliar silica of Example 4 to the A-type silica gel fine powder was 10:90.

This coating film had a function to adsorb and desorb moisture, and the moisture adsorption equilibrium was determined by a method in accordance with JIS 0701, wherein the coating film was left to adsorb moisture for 48 hours in a desiccator having the relative humidity adjusted at 25° C. and the equilibrium moisture adsorption was obtained from the mass increase.

The equilibrium moisture adsorption was calculated on the basis of the mass of the silica coating film (the total mass of the secondary particles of foliar silica and the A-type silica gel) after the test piece was dried at 180° C. for two hours. The results are shown in Table 3.

TABLE 3

|       | Relative humidity % | Equilibrium moisture adsorption (%) |
|-------|---------------------|-------------------------------------|
| Ex. 20 | 20 | 8.2 |
|        | 50 | 18.6 |
|        | 90 | 26.4 |
| Ex. 25 | 20 | 7.8 |
|        | 50 | 18.7 |
|        | 90 | 25.6 |

Example 21
Separating Material for Thin Layer Chromatography Obtainable from a Hardenable Composition Having a Silica Gel Powder Incorporated to the Silica Slurry of Example 4

19.5 g of the slurry (solid content concentration: 15 mass %) after the treatment by the medium stirring beads mill in Example 4 and 100 g of deionized water were put into a 200 ml plastic container and mixed. Then, 56 g of fine spherical silica gel for liquid chromatography (MS gel, tradename, manufactured by Dohkai Chemical Industry CO., LTD., EP-DF-7-60A, average particle size: 7 $\mu$m) was added, followed by shaking and mixing for 10 minutes in a shaking machine (V-5 model, manufactured by Iwaki K.K.) to obtain a hardenable composition.

Then, a glass sheet (soda-lime glass, 100 mm×200 mm×2 mm thick) was prepared, and by setting the film thickness at 0.5 mm by means of an applicator, manufactured by Tanizawa Kagaku K.K.), the above slurry was coated on one side of the glass sheet. The coated glass sheet was dried at room temperature and further dried at 110° C. for one hour.

The mass ratio in the solid content of the secondary particles of foliar silica of Example 4 to the above fine spherical silica gel, was 5:95.

The appearance of the coating film was smooth, and no cracking or the like was observed, and the coating film was strong. The coating amount was 200 g/m$^2$ as calculated as the solid content, and the thickness of the coating film was about 250 $\mu$m.

Using this test piece, the performance for thin layer chromatography was measured and evaluated in accordance with a usual method. The separation was carried out in a developing tank employing a lipophilic system (hexane:chloroform=1:1).

As a sample for separation, a solution mixture of commercially available dye solutions (Macrolex Green, and Macrolex Violet, manufactured by Bayer, and SOT Blue manufactured by Hodogaya Chemical Industries Co., Ltd., each having a concentration of 0.1% in chloroform) was spotted at a position of 15 mm from the lower edge of the plate by means of a capillary and developed for a development distance of 150 mm from the spot. The distance of the developing solvent and the center distances of spots of the respective samples separated, were measured, and the ratio of the distance of each spot to the developed distance of the developing solvent was calculated and taken as the Rf value. The evaluation results are shown in Table 4.

TABLE 4

| Sample | Rf value |
|--------|----------|
| Macrolex Green | 0.12 |
| SOT Blue | 0.07 |
| Macrolex Violet | 0.20 |

Example 22
Coating Film Having Ultraviolet Ray-Shielding Function Obtainable from a Hardenable Composition having Titanium Oxide Fine Particles Incorporated to the Dried Powder of the Secondary Particles of Foliar Silica of Example 4

Into a 250 ml plastic bottle, 25 g of a fluorine resin coating material (Lumiflon LF-200, tradename, manufactured by Asahi Glass Company, Limited, solid content concentration: 60 mass %), 2.5 g of a hardening agent (Duranate TPA-100, manufactured by Asahi Kasei K.K.) and 1.5 g of xylene were introduced. Then, 3.9 g of the fine powder of the secondary particles of foliar silica (average particle size: 3.7 $\mu$m) obtained from an aqueous slurry of secondary particles of foliar silica in Example 4, by adjusting the slurry concentration to a solid content concentration of 3 mass %, and spray-drying by means of a small size spray drier with a slurry supplying rate of 5 ml/min under a spray pressure of 0.3 MPa(G) at a hot air temperature of 200° C. and 2.1 g of titanium oxide fine particles (TTO-51A, manufactured by Ishihara Sangyo K.K., average particle size: 0.01 $\mu$m, rutile type) were added to the above plastic bottle. The 250 ml plastic bottle was shaked by a shaking machine (V-5 model, manufactured by Iwaki K.K.) until the entirety became uniform, and then, the slurry was put into a tumbler shaker mixer (T2C model, manufactured by Shinmaru Enterprises Co.) and shaked and mixed for 30 minutes.

Then, a quartz glass sheet (100 mm×100 mm×2 mm thick) was prepared, and the slurry was coated on one side of the quartz glass sheet by a bar coater coating method (JIS K5400) by means of a #40 bar coater (manufactured by Eto Kikai K.K.), and dried at room temperature to obtain a test piece. The coated amount was 20 g/m$^2$ as calculated as the solid content, and the thickness of the coating film was 30 $\mu$m. The mass ratio in the solid content of the fluorine resin coating material, the fine particle of the secondary particles of foliar silica and the titanium oxide fine particles, was 74.5:16.5:9.0.

Evaluation of the coating film of such a test piece was such that the pencil hardness was 3H, and the cross cut test evaluation point was 8 points.

In the same manner, a quartz glass sheet (100 mm×100 mm×2 mm thick) was prepared, and the slurry was coated on one side of the quartz glass sheet by a bar coater coating method (JIS K5400) by means of a #80 bar coater (manufactured by Eto Kikai K.K.) and dried at room temperature to obtain a test piece. The coated amount was 30 g/m$^2$ as calculated as the solid content, and the thickness of the coating film was 45 $\mu$m.

Further, in the same manner, a quartz glass sheet (100 mm×100 mm×2 mm thick) was prepared, and the slurry was coated on one side of the quartz glass sheet by a bar coater coating method (JIS K5400) by means of a #100 bar coater (manufactured by Eto Kikai K.K.) and dried at room temperature to obtain a test piece. The coated amount was 37 g/m² as calculated as the solid content, and the thickness of the coating film was 55 µm. With respect to each test piece, the transmittance at each wavelength was measured by means of a self-recording spectrophotometer (U-4000 model, manufactured by Hitachi Seisakusho K.K.), and the ultraviolet ray-shielding shielding performance was obtained. The evaluation results are shown in Table 5.

TABLE 5

| Wavelength of light rays | Transmittance at each wavelength (%) Film thickness | | |
|---|---|---|---|
| | 30 µm | 45 µm | 55 µm |
| 500 nm | 64.06 | 55.36 | 49.00 |
| 420 nm | 56.60 | 47.80 | 40.72 |
| 400 nm | 48.54 | 37.69 | 29.07 |
| 380 nm | 20.85 | 9.46 | 3.61 |
| 360 nm | 7.31 | 1.79 | 0.25 |
| 320 nm | 0.22 | 0.02 | 0.00 |
| 290 nm | 0.11 | 0.05 | 0.01 |

Example 23
Coating Film having Photo Oxidation Catalytic Function Obtainable from a Hardenable Composition having Titanium Oxide Fine Particle Incorporated to the Silica Slurry of Example 4

Into a 250 ml plastic bottle, 149.8 g of the slurry (solid content concentration: 15 mass %) after the treatment by the medium stirring beads mill in Example 4 was introduced, and then, 21.1 g of titanium oxide ultra fine particles (ST-01, manufactured by Ishihara Sangyo K.K., average particle size: 0.01 µm, anatase type) were added to the above plastic bottle. The 250 ml plastic bottle was shaked by a shaking machine (V-5 model, manufactured by Iwaki K.K.) until the entirety became uniform, and then, the slurry was put into a tumbler shaker mixer (T2C model, manufactured by Shin-maru Enterprises Co.) and mixed and dispersed for 30 minutes.

Then, a glass sheet (soda-lime glass, 100 mm×100 mm×2 mm thick) was prepared, and the slurry was coated on one side of the quartz glass sheet by a bar coater coating method (JIS K5400) by means of a #80 bar coater (manufactured by Eto Kikai K.K.), and dried at room temperature to obtain a test piece. Then, it was further heat-treated at 500° C. for one hour to obtain a test piece.

The mass ratio in the solid content of the coating material, the fine particle of secondary particles of foliar silica and titanium oxide fine particles, was 65:35.

The coated amount was 30 g/m² as calculated as the solid content. The pencil hardness of the coating film was B, and the evaluation point by the cross cut test was 10 points.

Using a Petri dish, (inner diameter: 200 mm, depth: 50 mm) containing 500 ml of a 33.3 mg/l methanol aqueous solution, this test piece was immersed so that the coated side was located above and the coated surface became lower than the liquid surface. Further, while stirring the liquid with a stirrer and permitting air to dissolve from the liquid surface, an ultraviolet ray lamp (30 W) was irradiated from above the liquid surface at a distance of 30 cm from the liquid surface for 60 hours. As a blank for comparison, a glass sheet having the same size and having no coating was tested under the same conditions as for the test piece.

With respect to the methanol aqueous solution after irradiation, the COD value in the liquid was measured in accordance with JIS K0120. The COD value (mg/l) was 34 before the treatment and not more than 1 after the treatment, and it was 30 with the blank.

Example 24
Molded Product by Wet System Compression Molding (Dehydration Compression Molding) of the Silica of Example 4 Alone The slurry (solid content concentration: 15 mass %) after the treatment by the medium stirring beads mill in Example 4 was concentrated by evaporating the water content under reduced pressure with stirring to obtain a soft wet cake having a solid content concentration of 32.8 mass %.

13 g of this wet cake was filled in a cylinder of a pellet pressing machine (inner diameter of 20 mm×stroke of 50 mm). At the lower part of the cylinder, a filter paper was placed to remove water.

A piston was mounted, and pressure was exerted by a hand press gradually from 1.96 MPa to 19.6 MPa to obtain a cylindrical wet pellet (diameter: 20 mm, height: 10 mm) as a molded product. This pellet was dried at 120° C. for two hours by means of a box-type drier to obtain a dried pellet (diameter: 20 mm, height: 10 mm) having a mass of 4.1 g.

For the measurement of the compression strength of the dry pellet, a push rod (forward end diameter: 3 mm) was attached to a compression strength testing machine (980 compression strength testing machine, manufactured by Kyushu Marutou K.K.), and the pellet was compressed and broken. The ring displacement at that time was read by a micrometer and calculated as a load. Ten pellets were measured, and the average value of the compression load at the time of breakage of the pellets, was obtained and found to be 710 N.

Example 25
Molded Product having a Water-Adsorbing Function, by Wet System Compression Molding (Dehydration Compression Molding) of a Mixture of the Silica of Example 4 and the A-Type Silica Gel 2.77 g of the same wet cake as in Example 24 (solid content concentration: 32.8 mass %) and 10.23 g of an aqueous slurry of A-type silica gel (solid content concentration: 17.8 mass %, average particle size: 4 µm) were mixed and then filled in a cylinder of a pellet pressing machine.

A piston was mounted, and pressure was gradually exerted by a hand press from 1.96 MPa to 19.6 MPa to obtain 5.18 g of a wet pellet. This pellet was dried at 120° C. for two hours in a box-type drier to obtain a dried pellet (diameter: 20 mm, height: 10 mm) having a mass of 3.2 g, as a molded dry product. The measurement of the compression strength of the pellet was carried out in the same method as in Example 24, and the average value of the compression load at the time of breakage of the pellets was 108 N. The mass ratio of the secondary particles of foliar silica to the A-type silica gel in the pellet was 33.3:66.7.

The water adsorption equilibrium value of the above dry pellet was measured in accordance with JIS Z0701. The results of the measurement are shown in Table 3.

Example 26
Adhesive Composition: A Case Wherein the Secondary Particles of Foliar Silica are Used Alone The slurry of the secondary particles of foliar silica having a solid content concentration of 15 mass % (average particle size: 1.6 µm) obtained by monodisperse treatment by the medium stirring beads mill disclosed in Example 4, was put into a 50 ml beaker and sufficiently stirred and mixed by a stirrer, to obtain an adhesive composition in a slurry form.

Then, two sheets of a test piece (glass sheet, 25 mm×100 mm×2 mm thick) in accordance with JIS K6848, were prepared, and an adhesive test of sheets of the same material was carried out. The test method was such that using a forward end portion of 12.5 mm of each sheet as a portion to be bonded, and one drop of the above slurry was coated by means of a dropping pipet, and the two sheets were put together and left to stand horizontally, and while exerting a load of 1 kg thereon, dried at room temperature for 48 hours to obtain a test specimen.

The adhesive per unit area of the adhesive layer was in an extremely small amount at a level of about 3 g/m$^2$ as calculated as the solid content, and the thickness of the adhesive layer was about 5 μm.

The appearance of the glass bonded surface was translucent and uniform, and no cracking or the like was observed.

With respect to the evaluation methods for the adhesive strength, the tensile shear adhesive strength was measured in accordance with JIS K6850, and the compression shear adhesive strength was measured in accordance with JIS K6852. The tensile shear adhesive strength was 0.9 N/mm$^2$, and the compression shear adhesive strength was 0.7 N/mm$^2$.

Example 27
Adhesive Composition: The Secondary Particles of Foliar Silica/Sodium Silicate Type 20.0 g of the slurry of the secondary particles of foliar silica having a solid content concentration of 15 mass % (average particle size: 1.6 μm) obtained by monodisperse treatment by the medium stirring beads mill as disclosed in Example 4, was put into a 50 ml glass bottle. Then, 2.34 g of an aqueous sodium silicate solution (Na$_2$O: 18.0 mass %, SiO$_2$: 36.5 mass %, SiO$_2$/Na$_2$O molar ratio: 2.1) was added, and the bottle was shaked for uniform mixing to obtain an adhesive composition in a slurry form. The mass ratio based on the solid content of the secondary particles of foliar silica to sodium silicate was 70:30.

Then, two sheets of a test piece (glass sheet, 25 mm×100 mm×2 mm thick) in accordance with JIS K6848, were prepared, and an adhesive test of glass sheets was carried out. The test method was such that using the forward end portion of 12.5 mm of each sheet as a portion to be bonded, and one drop of the above slurry was coated by means of a dropping pipet, and the two sheets were put together and left to stand horizontally, and while exerting a load of 1 kg thereon, dried at room temperature for 24 hours and then heat-treated at 450° C. for one hour to obtain a test piece.

The adhesive per unit area of the adhesive layer was in an extremely small amount at a level of about 7 g/m$^2$ as calculated as the solid content, and the thickness of the adhesive layer was about 8 μm.

Further, the appearance of the glass bonded surface was translucent and uniform, and no cracking or the like was observed.

With respect to the evaluation methods for the adhesive strength, the tensile shear adhesive strength was measured in accordance with JIS K6850, and the compression shear adhesive strength was measured in accordance with JIS K6852. The tensile shear adhesive strength was 2.5 N/mm$^2$, and the compression shear adhesive strength was 1.8 N/mm$^2$.

Example 28
The Secondary Particles of Foliar Silica/Glass Balloons Type Heat-Insulating Coating Material 10.7 g of the slurry of the secondary particles of foliar silica having a solid content concentration of 15 mass % (average particle size: 1.6 μm) obtained by the monodisperse treatment by the medium stirring beads mill as disclosed in Example 4, 5 g of glass balloons having an average particle size of 34 μm and an average specific gravity of particles of 0.39 (Cellstar SX-39, tradename, Tokai Kogyo K.K., made of borosilicate glass) and 30 g of water, were put into beaker and sufficiently stirred and mixed by a stirrer to obtain a hardenable composition for a heat-insulating coating material in a slurry form.

Then, a glass sheet (70 mm×70 mm×1.6 mm thick) was prepared, and the slurry was coated on the glass sheet by means of a bar coater, then dried at room temperature and then heat-treated at 400° C. for one hour, to obtain a test piece. The coated amount was about 250 g/m$^2$ as calculated as the solid content, and the thickness of the coating layer was about 1.7 mm. The appearance of the coating film was smooth, and no cracking or the like was observed.

Here, the mass ratio in the solid content of the glass balloons to the secondary particles of foliar silica was 75:25.

Then, the above-mentioned test piece was put on a hot plate maintained at 100° C. so that the coated layer side was located above, and upon expiration of one hour, the surface temperature on the coated layer side was measured by a surface thermometer, whereby the surface temperature was 47° C.

Example 29
Formation of a Transparent Coating Film by an Overcoating Method 20 g of the slurry having a silica having a solid content concentration of 15 mass % (average particle size: 1.6 μm) treated by the medium stirring beads mill as disclosed in Example 4, and 10 g of a urethane resin type aqueous emulsion coating material (Adecabontiter HUX-350, tradename, for a clear type coating material, manufactured by Asahi Denka Kogyo K.K., solid content concentration: 30 mass %) (as calculated as the solid content, silica:resin= 1:1), were put into a beaker and sufficiently stirred and mixed by a stirrer, to obtain a hardenable composition.

Then, a quartz glass sheet (100 mm×100 mm×2 mm, the same applies in the following Examples) was prepared, and the above hardenable composition was coated on one side of the above quartz glass sheet by a bar coater coating method (JIS K5400) by means of a #80 bar coater, (manufactured by Eto Kikai K.K.) and dried at room temperature to obtain a test piece. The coated amount was about 18 g/m$^2$ as calculated as the solid content, and the thickness of the coating film after drying was about 30 μm. The appearance of the coating film was translucent, and it was a coating film having no gloss.

On the above hardened coating film, a urethane resin type aqueous emulsion coating material (Adecabontiter HUX-350, tradename, for a clear type coating material, manufactured by Asahi Denka Kogyo K.K., solid content concentration: 30 mass %) was coated by means of a #20 bar coater (manufactured by Eto Kikai K.K.) and dried at room temperature to obtain a test piece. The total coated amount of the entire coating film was about 24 g/m$^2$ as calculated as the solid content, and the total thickness of the coating film of the entire hardened coating film after drying (the total thickness of the silica-containing coating film and the overcoat layer) was about 40 μm.

The pore volume of this hardened coating film was measured by a BET method, whereby the pore volume (which corresponds to $V_1$ in the formula (1)) was 0.032 ml/g. When a calculated value (which corresponds to $V_2$ in the formula (1)) of the pore volume of the silica-containing coating layer (the mixed coating layer) is obtained therefrom, $V_2$ was 0.043 ml/g. The appearance of the coating film was transparent, and it was a highly glossy coating film.

Then, the transmittance of light rays of light with a wavelength of 500 nm, of the hardened coating film (the silica-containing coating film+the overcoat layer) formed on the quartz glass sheet, was measured, whereby the transmittance was as high as 98.85%. When the transmittance calculated for a case where the silica-containing coating layer (the mixed coating layer) had a film thickness of 50 μm, from the formula (2) using the Beer rule, the transmittance was 98.09%.

Example 30
Formation of a Transparent Coating Film Using the Secondary Particles of Foliar Silica by a Fine Pulverization Method 21.4 g of the slurry having a solid content concentration of 14 mass % (average particle size: 0.56 μm) treated by the medium stirring beads mill as disclosed in Example 6, and 10 g of a urethane resin type aqueous emulsion coating material (Adecabontiter HUX-350, tradename, for a clear type coating material, manufactured by Asahi Denka Kogyo K.K., solid content concentration: 30 mass %) (as calculated as the solid content, silica:resin=1:1), were put into a beaker and sufficiently stirred and mixed by a stirrer, to obtain a hardenable composition. The above hardenable composition was coated on one side of a quartz glass sheet by a bar coater coating method (JIS K5400) by means of a #80 bar coater, (manufactured by Eto Kikai K.K.) and dried at room temperature to obtain a test piece. The coated amount was about 18 g/m² as calculated as the solid content, and the thickness of the coating layer after drying was about 30 μm.

The pore volume of this hardened coating film was measured by a BET method, whereby the pore volume was 0.031 ml/g. The appearance of the coating film was transparent, and it was a highly glossy coating film.

Then, the transmittance of light rays of light with a wavelength of 500 nm, of the hardened coating film formed on the quartz glass sheet, was measured and found to be as high as 98.39%. The transmittance in a case where the silica-containing coating layer (the mixed coating layer) had a film thickness of 50 μm, was calculated by the formula (2) using the Beer rule, whereby the transmittance was 97.33%.

This hardened coating film was evaluated with respect to the pencil hardness in accordance with JIS K5400 and the cross cut test, whereby the pencil hardness was H, and evaluation by the cross cut test was 10 points. Thus, it was confirmed that the film-forming property was not impaired.

Example 31
Formation of a Coating Film Having High Water Resistance

A slurry obtained by adding 3.2 g of titanium oxide for pigment as functional fine particles (CR-50, manufactured by Ishihara Sangyo K.K., average particle size: 0.25 μm) and 1.7 g of water to 50 g of the aqueous slurry having a solid content concentration of 15 mass % of the secondary particles of foliar silica as disclosed in Example 4, was highly dispersed by means of a small size medium beads mill (Dyno mill KDL A model, manufactured by Shinmaru Enterprises Co., the same applies in the following Examples and Comparative Examples), to obtain a hardenable composition in an aqueous slurry form having a solid content concentration of 24.2 mass %, for forming a hardened coating film (as calculated as mass of the solid content, the secondary particles of foliar silica:titanium oxide fine particles=70:30).

Then, as a substrate on which a hardened coating film was to be formed, a stainless steel plate (25 mm×76 mm×0.95 mm) was prepared, and in accordance with JIS K5400, the surface of the stainless steel plate was subjected to sand cloth polishing treatment by means of a sand cloth of cloth number AA-240 and then further subjected to degreasing treatment (using a mixed liquid of xyrene:isopropylalcohol= 1:1 as the treating solvent).

The surface roughness of the above sand cloth polished stainless steel plate was observed by a scanning electron microscope, whereby it was observed that numerous fine irregularities and scratch marks were formed. Further, the maximum height Ry in the surface roughness of the surface was 3.0 μm.

Then, the hardenable composition was coated on one side of the above stainless steel plate by a bar coater coating method (JIS K5400) by means of a #40 bar coater, (manufactured by Eto Kikai K.K.) and dried at room temperature for 3 hours, followed by heat treatment in air for one hour at a temperature of 250° C., 300° C., 400° C. or 500° C. to obtain a test piece. The coated amount of each test piece was about 31 g/m² as calculated as the solid content. Even after the heat treatment under the above conditions, this hardened coating film was a uniform smooth hardened coating film.

The test piece of the hardened coating film after the above heat treatment was evaluated by ① the water resistance test method according to JIS (a method wherein the test piece is immersed to stand still in water at room temperature for 18 hours, and a change of the hardened coating film immediately after withdrawing the test piece from the water and after leaving it to stand for two hours at room temperature, is evaluated), and ② an abrading water resistance test method. This abrading water resistance test method is a test method severer than the JIS method, wherein the test piece of the hardened coating film is immersed to stand still in water at room temperature for 24 hours, and then the test piece is taken out from the water and immediately placed on a table horizontally so that the hardened coating film side is located above, and the hardened film in the state wetted with the water is rubbed with index fingers of a plurality of normal adults of from 20 to 40 years old as intensely as possible for about 10 times with their body weights, whereby the presence or absence of any change in the hardened coating film is examined.

In the JIS method, one of which no change is visually observed after the test, is rated as "acceptable", and one which any undesirable change such as peeling, swelling or cracking of the film, is observed, is rated as "unacceptable".

On the other hand, in the abrading water resistant test method, one showing good water resistance such that deposition of some functional fine particles on the finger tip or a phenomenon of partial peeling of the hardened coating film is not substantially observed, is rated as "acceptable". On the other hand, one showing poor water resistance such that slight swelling of the hardened coating film is felt, some functional fine particles peeled from the surface of the hardened coating film is deposited on the finger tip, or a phenomenon of partial peeling of the hardened coating film is observed, is rated as "unacceptable".

In the present invention, a hardened film "having high water resistance" is one having good water resistance evaluated to be "acceptable" even in such an abrading water resistance test.

The hardened coating film of this Example comprises the secondary particles of foliar silica (70%) and the inorganic pigment (30%), and 100% of the hardened coating film is composed of inorganic material. Even in a case where the content of the inorganic pigment as functional fine particles is large at a level of 30 mass %, if the heat treating time after normal temperature drying for 3 hours, is one hour each, and the heat treating temperature level is 250° C., 300° C., 400° C. or 500° C., it has been found it possible to obtain a hardened coating film having high water resistance evaluated to be "acceptable" even by the abrading water resistance test method which is an evaluation method severer than the JIS method as mentioned above. Further, in the pencil hardness test before the water resistance test of the hardened coating film heat-treated at a temperature of at least 250° C., the pencil hardness was good at a level of from 3H to 8H, and the result of the cross cut test was also good with 8 points.

Comparative Example 1

As a substrate, the same stainless steel plate as in Example 31 was prepared, and the surface was subjected to degreasing treatment a mixed liquid of (xylene:isopropylalcohol= 1:1) only, without carrying out sand cloth polishing treatment. The same hardenable composition as used in Example 31, was coated thereon under the same conditions, to form a hardened coating film. Such a hardened coating film was a uniform, smooth hardened coating film even after the treatment at each of the above mentioned respective heating temperatures. Such hardened coating films were evaluated under the same method and conditions as in Example 31.

The hardened coating films after heating under the respective heating conditions and prior to the water resistance tests, were measured in accordance with JIS K5400. Under the respective heat treating conditions, the results were good at a level of from 3H to 8H in the pencil hardness test and at a level of from 8 to 10 points in the cross cut test.

However, the results of evaluation of the abrading water resistance of the heat treated products under the same heating conditions as in Example 31 (after drying at normal temperature for 3 hours, heated at 250° C., 300°C., 400° C. or 500° C. for one hour) were all "unacceptable".

Example 32

A slurry obtained by adding 50 g of an aqueous slurry having a solid content concentration of 15 mass % of the same secondary particles of foliar silica as used in Example 4, 1.25 g of titanium oxide for pigment as functional fine particles (CR-50, manufactured by Ishihara Sangyo K.K., average particle size: 0.25 μm), 9.38 g of an acrylic silicon resin type aqueous emulsion (Sanmol EW-102, tradename, manufactured by Sanyo Kasei Kogyo K.K., solid content concentration: about 40 mass %) and 0.67 g of water, was highly dispersed by means of a small size medium beads mill, to obtain a hardenable composition in an aqueous slurry form having a solid content concentration of 20.4 mass % for forming a hardened coating film (as calculated by mass of the solid content, the secondary particles of foliar silica:titanium oxide fine particles for pigment:the acrylic silicon resin=60:10:30).

Then, as a substrate on which a hardened coating film was to be formed, a stainless steel plate (25 mm×76 mm×0.95 mm) was prepared, and in accordance with JIS K5400, the surface of the stainless steel plate was subjected to sand cloth polishing treatment in the same manner as in Example 31 by means of a sand cloth having cloth number AA-240, and then further subjected to degreasing treatment (as the treating solvent, a mixed liquid of xylene:isopropylalcohol= 1:1, was used).

The surface roughness of the stainless steel plate subjected to the above sand cloth polished, was observed by a SEM, whereby it was observed that numerous fine irregularities and scratch marks were formed. Further, the maximum height Ry in the surface roughness of the surface was 3.0 μm.

Then, the above hardenable composition was coated on one side of the above stainless steel plate by a bar coater coating method (JIS K5400) by means of a #40 bar coater (manufactured by Eto Kikai K.K.) and dried at room temperature, followed by heat treatment in air at 100° C., 150° C. or 200° C. for one hour, to obtain a test piece. Further, a drying test at room temperature for 72 hours was also carried out. The coated amount of each test piece was about 31 g/m$^2$ as calculated as the solid content. This hardened coating film was a uniform smooth hardened coating film even after the heat treatment under the above conditions.

With respect to the hardened coating films after heating under the above-mentioned respective heating conditions, the measurements were carried out in accordance with JIS K5400 before the water resistance test, on 4 samples of varying drying condition of at normal temperature for 72 hours, and at 100° C., 150°C. and 200° C. for one hour whereby the good results were obtained such that in the pencil hardness test, the results were 2H, 2H, 3H and 3H, respectively, and in the cross cut test, the results were 8 points, 10 points, 10 points and 10 points, respectively.

Further, the test pieces of the above hardened coating films were evaluated by ① the JIS water resistance test method and ② the abrading water resistance test method. In both methods, the water resistance was "acceptable" with respect to all of the test pieces.

Thus, it was found possible to obtain a hardened coating film showing high water resistance in the abrading water resistance test method even in a case where it comprises the secondary particles of foliar silica (60%)/the inorganic pigment (10%)/the acrylic silicon resin (30%), i.e. 70% of the hardened coating film is composed of an inorganic substance, and the content of the inorganic pigment as functional fine particles therein is rather high at a level of 10 mass %.

It was found that the addition of a particle binder in an aqueous emulsion form comprising an acrylic silicon resin type as a particle binder, is effective to provide high water resistance also at the time of the abrading water resistance evaluation.

INDUSTRIAL APPLICABILITY

The secondary particles of foliar silica of the present invention have a self film-forming property and are capable of forming a strong silica coating film having acid resistance, alkali resistance and heat resistance at the same time even at normal temperature, and thus they are useful as a coating material or a particle binder for coating materials or agents for exterior or interior of buildings or structures, and further useful for various applications such as coating materials or agents having thermal functions, optical functions, adsorbing functions, catalytic functions (such as photo catalysts) or biological functions, or coating materials or agents having aromatic or deodorant functions.

The entire disclosures of Japanese Patent Application No. 11-351182 filed on Dec. 10, 1999, Japanese Patent Application No. 2000-139659 filed on May 12, 2000 and Japanese Patent Application No. 2000-206264 filed on Jul. 7, 2000 including specifications, claims, drawings and summaries are incorporated herein by reference in their entireties.

What is claimed is:

1. Scaly silica particles having a laminated structure, consisting essentially of:
   secondary particles of foliar silica;
   wherein each of said secondary particles is formed by a plurality of primary particles of scaly silica which are overlaid one on another and aligned face-to-face in parallel with one another; and
   wherein said secondary particles are present independent of one another.

2. The scaly silica particles according to claim 1, which have a pore distribution as measured by a nitrogen adsorption method, such that the pore diameters have a sharp peak at from 2 to 6 nm.

3. The scaly silica particles according to claim 1, wherein the secondary particles of foliar silica are a layered polysilicic acid.

4. The scaly silica particles according to claim 1, wherein the main peak in the X-ray diffraction analysis of the silica particles corresponds to silica X, silica Y or both.

5. A hardenable composition, comprising:
   scaly silica particles having a laminated structure, consisting essentially of secondary particles of foliar silica; and
   a volatile liquid;
   wherein each of said secondary particles is formed by a plurality of primary particles of scaly silica which are overlaid one on another and aligned face-to-face in parallel with one another; and
   wherein said secondary particles are present independent of one another.

6. The hardenable composition according to claim 5, further comprising a low-volatile substance which does not substantially evaporate at a temperature at which said volatile liquid evaporates.

7. The hardenable composition according to claim 6, wherein the low-volatile substance is at least one low-volatile substance selected from the group consisting of an organic polymer substance or a precursor substance for forming an organic polymer substance by a polymerization reaction, a substance having adsorbing and desorbing functions, a substance having a catalytic function, a substance having an optical function and a metal compound.

8. The hardenable composition according to claim 5, wherein a content of the scaly silica is from 1 to 80 mass %, as calculated as $SiO_2$.

9. The hardenable composition according to claim 5, further comprising a heat insulating material.

10. The hardenable composition according to claim 9, wherein the heat insulating material is at least one member selected from the group consisting of microballoons, porous particles and fibrous materials.

11. A hardened product, comprising:
    secondary particles of foliar silica formed by a plurality of primary particles of scaly silica overlaid one on another and aligned face-to-face in parallel with one another;
    wherein the secondary particles are laminated in parallel with one another.

12. The hardened product according to claim 11, which is formed on a substrate to have a layered structure.

13. The hardened product according to claim 12, further comprising a transparent organic polymer substance;
    wherein an average particle size of the secondary particles of foliar silica is less than 1 $\mu$m; and
    wherein said hardened product is substantially transparent;
    wherein a transmittance of light having a wavelength of 500 nm is at least 70%, as calculated for a layer thickness of 50 $\mu$m.

14. A process for producing scaly silica particles suitable for a hardenable composition, comprising:
    (1) subjecting either silica hydrogel, silica sol or hydrous silicic acid to hydrothermal treatment in the presence of an alkali metal salt to form tertiary agglomerated particles of scaly silica comprising secondary particles of foliar silica, each formed by a plurality of primary particles of scaly silica which are overlaid one on another and aligned face-to-face in parallel with one another, and tertiary particles formed by the secondary particles which are overlaid one on another three dimensionally irregularly to have pore spaces; and
    (2) disintegrating and dispersing the tertiary agglomerated particles of scaly silica to form foliar silica particles consisting essentially of secondary particles containing substantially no tertiary particles;
    wherein said hardenable composition consist essentially of secondary particles of foliar silica which have a laminated structure; and
    wherein the secondary particles are present independent of one another.

15. The process for producing scaly silica particles according to claim 14, wherein said silica hydrogel has a $SiO_2$ concentration of from 15 to 75 mass %.

16. The process for producing scaly silica particles according to claim 14, wherein said silica hydrogel is subjected to hydrothermal treatment;
    wherein a temperature of the hydrothermal treatment is from 150 to 220° C.;
    wherein the total molar ratio of $SiO_2/Me_2O$ is from 4 to 15 mol/mol; and
    wherein Me is an alkali metal.

17. The process for producing scaly silica particles according to claim 14, wherein the disintegration and dispersion of the tertiary agglomerated particles of silica are carried out using a wet system pulverizing apparatus.

18. The process for producing scaly silica particles according to claim 17, wherein the disintegration and dispersion of the tertiary agglomerated particles of silica are carried out using a high speed mechanical stirring wet system pulverizing apparatus employing medium beads.

* * * * *